(12) United States Patent
Patel et al.

(10) Patent No.: US 10,863,492 B2
(45) Date of Patent: Dec. 8, 2020

(54) LOW LATENCY DEVICE-TO-DEVICE COMMUNICATION

(71) Applicant: QUALCOMM Incorporated, San Diego, CA (US)

(72) Inventors: Shimman Arvind Patel, San Diego, CA (US); Wanshi Chen, San Diego, CA (US); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/164,632

(22) Filed: May 25, 2016

(65) Prior Publication Data

US 2017/0019886 A1    Jan. 19, 2017

Related U.S. Application Data

(60) Provisional application No. 62/193,340, filed on Jul. 16, 2015.

(51) Int. Cl.
*H04W 72/04* (2009.01)
*H04W 8/00* (2009.01)
(Continued)

(52) U.S. Cl.
CPC ......... *H04W 72/042* (2013.01); *H04L 5/0053* (2013.01); *H04W 4/70* (2018.02);
(Continued)

(58) Field of Classification Search
None
See application file for complete search history.

(56) References Cited

U.S. PATENT DOCUMENTS 6,920,190 B2    7/2005    Simmons et al.
8,260,328 B1    9/2012    Yellin et al.
(Continued)

FOREIGN PATENT DOCUMENTS

AU    2013364481 A1    6/2015
CN    103081386 A      5/2013
(Continued)

OTHER PUBLICATIONS

Intel Corporation, "eNB Controlled Resource Allocation for D2D Communication," 3GPP TSG RAN WG1 Meeting #77, R1-142017, Seoul, Korea, May 19-23, 2014, 6 pgs., XP_050789137A, 3rd Generation Partnership Project.
(Continued)

*Primary Examiner* — Noel R Beharry
*Assistant Examiner* — Rodrick Mak
(74) *Attorney, Agent, or Firm* — Dalei Dong; Holland & Hart LLP

(57) ABSTRACT

Methods, systems, and devices for wireless communication using various patterns of data and reference signals are described. For example, in a system that supports operation using different duration transmission time intervals (TTIs), a base station may initiate communication with a user equipment (UE) or between two UEs, and UEs may communicate with the base station or with one another using an indicated pattern of data and reference signals. The base station may send a downlink control message indicating a transmission pattern selected from a set of patterns. UEs may identify the pattern based on the indicator and decode a sequence of data and reference signals based on the pattern. In some examples, the sequence may include a set of TTIs, which may have a shorter duration than other TTIs.

24 Claims, 17 Drawing Sheets

Pattern A

Pattern B

(51) Int. Cl.
*H04W 76/14* (2018.01)
*H04W 4/70* (2018.01)
*H04L 5/00* (2006.01)
*H04W 88/08* (2009.01)
*H04W 88/02* (2009.01)
*H04W 48/12* (2009.01)

(52) U.S. Cl.
CPC ........... *H04W 8/005* (2013.01); *H04W 76/14* (2018.02); *H04W 48/12* (2013.01); *H04W 72/0446* (2013.01); *H04W 88/02* (2013.01); *H04W 88/08* (2013.01)

(56) References Cited

U.S. PATENT DOCUMENTS

| | | | |
|---|---|---|---|
| 9,591,618 B2* | 3/2017 | Shi | H04W 28/16 |
| 2005/0098634 A1* | 5/2005 | Good | G06K 7/10693 235/462.39 |
| 2009/0174625 A1* | 7/2009 | Kim | G09G 3/3659 345/55 |
| 2009/0290555 A1* | 11/2009 | Alpert | H04W 4/20 370/331 |
| 2009/0304198 A1* | 12/2009 | Herre | G10L 19/008 381/66 |
| 2009/0327893 A1* | 12/2009 | Terry | G06F 3/1438 715/719 |
| 2011/0021146 A1* | 1/2011 | Pernu | H04W 88/06 455/41.2 |
| 2013/0273926 A1 | 10/2013 | Peng et al. | |
| 2013/0322277 A1 | 12/2013 | Vanganuru et al. | |
| 2014/0056220 A1* | 2/2014 | Poitau | H04W 76/14 370/328 |
| 2014/0071954 A1* | 3/2014 | Au | H04W 72/0446 370/336 |
| 2014/0119306 A1 | 5/2014 | Yang et al. | |
| 2015/0163790 A1 | 6/2015 | Lee et al. | |
| 2015/0215903 A1* | 7/2015 | Zhao | H04W 72/04 370/329 |
| 2015/0334689 A1* | 11/2015 | Nishio | H04L 5/0007 370/329 |
| 2015/0334709 A1* | 11/2015 | Ji | H04W 72/0453 370/330 |
| 2017/0223670 A1* | 8/2017 | Chen | H04L 5/0053 |
| 2017/0290008 A1* | 10/2017 | Tooher | H04L 1/0007 |
| 2018/0035430 A1* | 2/2018 | Futaki | H04W 72/04 |
| 2018/0302900 A1* | 10/2018 | Ibars Casas | H04L 5/0053 |

FOREIGN PATENT DOCUMENTS

| | | |
|---|---|---|
| CN | 104335654 A | 2/2015 |
| CN | 104427631 A | 3/2015 |
| JP | 2017530653 A | 10/2017 |
| KR | 20130105820 A | 9/2013 |

OTHER PUBLICATIONS

ISA/EP, International Search Report and Written Opinion of the International Searching Authority, Int'l Application No. PCT/US2016/034409, dated Aug. 31, 2016, European Patent Office, Rijswijk, NL, 17 pgs.

Intel Corporation: "Discussion on D2D Data Communication Physical Channel Design," 3GPP Draft; R1-140128 Intel—D2D PHY Channel, 3rd Generation Partnership Project (3GPP), Mobile Competence Centre; 650, Route Des Lucioles; F-06921 Sophia-Antipolis Cedex; France, vol. RAN WG1, No. Prague, Czech Republic; Feb. 10, 2014-Feb. 14, 2014, Feb. 9, 2014 (Feb. 9, 2014), XP050735692, 7 pages,Retrieved from the Internet: URL: http://www.3gpp.org/ftp/Meetings_3GPP_SYNC/RAN/RAN1/Docs/ [retrieved on Feb. 9, 2014].

Qualcomm Incorporated: "Support of UE-Network Relays [Online]", 3GPP TSG-RAN WG1#81, 3GPP, May 29, 2015, 10 Pages, R1-152778, [2020.01.30], URL: http://www.3gpp.org/ftp/tsg_ran/WG1_RL1/TSGR1_81/Docs/R1-152778.zip.

* cited by examiner

Pattern A

Pattern B

LOW LATENCY DEVICE-TO-DEVICE COMMUNICATION

CROSS REFERENCES

The present Application for Patent claims priority to U.S. Provisional Patent Application No. 62/193,340 entitled "Low Latency Device-to-Device Communication," filed Jul. 16, 2015, assigned to the assignee hereof.

BACKGROUND

The following relates generally to wireless communication and more specifically to low latency and device-to-device communication.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems.

These multiple access technologies have been adopted in various telecommunication standards to provide a common protocol that enables different wireless devices to communicate on a municipal, national, regional, and even global level. An example telecommunication standard is Long Term Evolution (LTE). LTE is designed to improve spectral efficiency, lower costs, improve services, make use of new spectrum, and better integrate with other open standards. LTE may use OFDMA on the downlink (DL), single-carrier frequency division multiple access (SC-FDMA) on the uplink (UL), and multiple-input multiple-output (MIMO) antenna technology. A wireless multiple-access communications system (including an LTE system) may include a number of base stations, each supporting communication for multiple communication devices, which may be otherwise known as user equipment (UE).

Some wireless systems may support device-to-device (D2D) communication, which may enable UEs to communicate directly with each other without an intermediate connection to a central node, such as a base station. In some cases, the UEs may send control and data transmissions to each other. These transmissions may have substantial latency between transmissions relative to uplink and downlink transmissions depending on the transmission time interval (TTI) configuration employed in the system.

SUMMARY

A wireless communication system may be configured for low latency communication using predefined patterns of data and reference signals. The system may support operation with multiple transmission time intervals (TTIs) of varying lengths. By way of example, a system may support one TTI duration that is significantly shorter (e.g., by an order of magnitude) than another TTI duration. A base station may initiate communication with a user equipment (UE) or between two UEs, and UEs may communicate with the base station or with one another using an indicated pattern of data and reference signals. The base station may send a downlink control message indicating a transmission pattern selected from a set of patterns. UEs may identify the pattern based on the indicator and decode a sequence of data and reference signals based on the pattern. In some examples, the sequence may include a set of TTIs, which may have a shorter duration than other TTIs. Transmissions from the UE may use a short-duration TTI supported by the system, while, in some cases, the downlink control message may use a relatively longer duration TTI.

A method of wireless communication is described. For example, the method may be employed in a system that supports a first duration transmission time interval (TTI) and a second duration TTI that is greater than the first duration TTI. The method may include receiving a control message comprising an indicator of a pattern corresponding to a sequence of data and reference signal transmissions that use a first duration TTI. The method may also include identifying the pattern based at least in part on the indicator and decoding the sequence of data and reference signal transmissions using the pattern.

An apparatus for wireless communication is described. For example, the apparatus may be employed in a system that supports a first duration transmission time interval (TTI) and a second duration TTI that is greater than the first duration TTI. The apparatus may include means for receiving a control message comprising an indicator of a pattern corresponding to a sequence of data and reference signal transmissions that use the first duration TTI, means for identifying the pattern based at least in part on the indicator, and means for decoding the sequence of data and reference signal transmissions using the pattern.

A further apparatus for wireless communication is described. For example, the apparatus may be employed in a system that supports a first duration transmission time interval (TTI) and a second duration TTI that is greater than the first duration TTI. The apparatus may include a processor, memory in electronic communication with the processor, and instructions stored in the memory and operable. The instructions may be executable by the processor to cause the apparatus to receive a control message comprising an indicator of a pattern corresponding to a sequence of data and reference signal transmissions that use the first duration TTI, identify the pattern based at least in part on the indicator, and decode the sequence of data and reference signal transmissions using the pattern.

A non-transitory computer-readable medium storing code for wireless communication is also described. For example, the code may relate to wireless communication in a system that supports a first duration transmission time interval (TTI) and a second duration TTI that is greater than the first duration TTI. The code may include instructions executable to receive a control message comprising an indicator of a pattern corresponding to a sequence of data and reference signal transmissions that use the first duration TTI, identify the pattern based at least in part on the indicator, and decode the sequence of data and reference signal transmissions using the pattern.

In some examples of the method, apparatuses, or non-transitory computer-readable medium described herein, identifying the pattern comprises selecting the pattern from a predetermined set of patterns based at least in part on the indicator. Additionally or alternatively, some examples may include processes, features, means, or instructions for receiving a synchronization or discovery signal during a second duration TTI, wherein the control message is received during a first duration TTI.

Some examples of the method, apparatuses, or non-transitory computer-readable medium described herein may further include processes, features, means, or instructions for establishing a connection with a mobile device based at least in part on the synchronization or discovery signal, wherein the control message is received from the mobile device. Additionally or alternatively, in some examples the sequence comprises a set of first duration TTIs, and wherein each TTI of the set of first duration TTIs comprises a symbol period and may include either data or a reference signal.

In some examples of the method, apparatuses, or non-transitory computer-readable medium described herein, each TTI of the set of first duration TTIs comprises a symbol period. Additionally or alternatively, in some examples a data symbol of the sequence comprises the control message.

In some examples of the method, apparatuses, or non-transitory computer-readable medium described herein, the sequence of data and reference signal transmissions comprises two or more TTIs corresponding to data retransmissions. Additionally or alternatively, in some examples the control message comprises a resource block assignment, a modulation and coding scheme (MCS), a timing advance, a group destination identification (ID), or a time resource allocation, or any combination thereof.

Some examples of the method, apparatuses, or non-transitory computer-readable medium described herein may further include processes, features, means, or instructions for receiving from a base station a request for a quality report, and transmitting the quality report to the base station in response to the request. Additionally or alternatively, some examples may include processes, features, means, or instructions for receiving an indication from the base station to operate using the first duration TTI, wherein the indication is responsive to the quality report.

A further method of wireless communication is described. For example, the method may be employed in a system that supports a first duration transmission time interval (TTI) and a second duration TTI that is greater than the first duration TTI. The method may include receiving a downlink control message comprising an indicator of a pattern corresponding to a sequence of data and reference signal transmissions that use the first duration TTI. The method may also include identifying the pattern based at least in part on the indicator, and transmitting the sequence of data and reference signals based at least in part on the pattern. In some examples, the method includes transmitting a control message that includes the indicator.

An apparatus for wireless communication is described. For example, the apparatus may be employed in a system that supports a first duration transmission time interval (TTI) and a second duration TTI that is greater than the first duration TTI. The apparatus may include means for receiving a downlink control message comprising an indicator of a pattern corresponding to a sequence of data and reference signal transmissions that use the first duration TTI. The apparatus may also include means for identifying the pattern based at least in part on the indicator, and means for transmitting the sequence of data and reference signals based at least in part on the pattern. In some examples, the apparatus includes means for transmitting a control message that includes the indicator.

A further apparatus for wireless communication is described. For example, the apparatus may be employed in a system that supports a first duration transmission time interval (TTI) and a second duration TTI that is greater than the first duration TTI. The apparatus may include a processor, memory in electronic communication with the processor, and instructions stored in the memory. The instructions may be operable, when executed by the processor, to cause the apparatus to receive a downlink control message comprising an indicator of a pattern, corresponding to a sequence of data and reference signal transmissions that use the first duration TTI, identify the pattern based at least in part on the indicator and transmit the sequence of data and reference signals based at least in part on the pattern. In some examples, that instructions may be executable by the processor to cause the device to transmit a control message that includes the indicator.

A non-transitory computer-readable medium storing code for wireless communication is described. For example, the code may relate to wireless communication in a system that supports a first duration transmission time interval (TTI) and a second duration TTI that is greater than the first duration TTI. The code may include instructions executable to receive a downlink control message comprising an indicator of a pattern, corresponding to a sequence of data and reference signal transmissions that use the first duration TTI, identify the pattern based at least in part on the indicator, and transmit the sequence of data and reference signals based at least in part on the pattern. In some examples, the instructions are executable to transmit a control message that includes the indicator.

In some examples of the method, apparatuses, or non-transitory computer-readable medium described herein, identifying the pattern comprises selecting the pattern from a predetermined set of patterns based at least in part on the indicator. Additionally or alternatively, some examples may include processes, features, means, or instructions for transmitting a synchronization or discovery signal during the second duration TTI, wherein the control message is transmitted during the first duration TTI.

Some examples of the method, apparatuses, or non-transitory computer-readable medium described herein may further include processes, features, means, or instructions for establishing a sidelink connection with a mobile device based at least in part on the synchronization or discovery signal, wherein the control message is transmitted to the mobile device. Additionally or alternatively, in some examples the sequence comprises a set of first duration TTIs, and wherein each TTI of the set of first duration TTIs comprises a symbol period and may include either data or a reference signal.

In some examples of the method, apparatuses, or non-transitory computer-readable medium described herein, each TTI of the set of first duration TTIs comprises a symbol period. Additionally or alternatively, in some examples a data symbol of the sequence comprises the control message.

In some examples of the method, apparatuses, or non-transitory computer-readable medium described herein, the sequence of data and reference signal transmissions comprises two or more TTIs corresponding to data retransmissions. Additionally or alternatively, in some examples the downlink control message comprises a resource block assignment, a modulation and coding scheme (MCS), a timing advance, a group destination identification (ID), or a time resource allocation, or any combination thereof.

Some examples of the method, apparatuses, or non-transitory computer-readable medium described herein may further include processes, features, means, or instructions for transmitting to a base station signaling indicative of a desired mobile device for a sidelink connection, and receiving a confirmation message for the sidelink connection from the base station in response to the signaling, wherein the control message is transmitted using the sidelink connection with the desired mobile device. Additionally or alternatively, in some examples the confirmation message is based at least in part on the desired mobile device having a link quality above a threshold.

In some examples of the method, apparatuses, or non-transitory computer-readable medium described herein, the confirmation message comprises an estimated signal strength associated with the desired mobile device.

Another method of wireless communication is described. For example, the method may be employed in a system that supports a first duration transmission time interval (TTI) and a second duration TTI that is greater than the first duration TTI. The method may include transmitting a sidelink initiation signal to a first mobile device and to a second mobile device and determining a pattern corresponding to a sequence of data and reference signal transmissions from the first mobile device to the second mobile device. The sequence of data and reference signal transmissions may use the first duration TTI. The method may also include transmitting a downlink control message to the first mobile device, the downlink control message comprising an indicator of the pattern.

Another apparatus for wireless communication is described. For example, the method may be employed in a system that supports a first duration transmission time interval (TTI) and a second duration TTI that is greater than the first duration TTI. The apparatus may include means for transmitting a sidelink initiation signal to a first mobile device and to a second mobile device and means for determining a pattern corresponding to a sequence of data and reference signal transmissions from the first mobile device to the second mobile device. The sequence of data and reference signal transmissions may use the first duration TTI. The apparatus may also include means for transmitting a downlink control message to the first mobile device, the downlink control message comprising an indicator of the pattern.

A further apparatus for wireless communication is described. For example, the method may be employed in a system that supports a first duration transmission time interval (TTI) and a second duration TTI that is greater than the first duration TTI. The apparatus may include a processor, memory in electronic communication with the processor, and instructions stored in the memory. The instructions may be operable, when executed by the processor, to cause the apparatus to transmit a sidelink initiation signal to a first mobile device and to a second mobile device and determine a pattern corresponding to a sequence of data and reference signal transmissions from the first mobile device to the second mobile device. The sequence of data and reference signal transmissions may use the first duration TTI. The instructions may also be executable to cause the apparatus to transmit a downlink control message to the first mobile device, the downlink control message comprising an indicator of the pattern.

Another non-transitory computer-readable medium storing code for wireless communication is described. For example, the code may relate to wireless communication in a system that supports a first duration transmission time interval (TTI) and a second duration TTI that is greater than the first duration TTI. The code may include instructions executable to transmit a sidelink initiation signal to a first mobile device and to a second mobile device and determine a pattern corresponding to a sequence of data and reference signal transmissions from the first mobile device to the second mobile device. The sequence of data and reference signal transmissions may use the first duration TTI. The code may also be executable to transmit a downlink control message to the first mobile device, the downlink control message comprising an indicator of the pattern.

Some examples of the method, apparatuses, or non-transitory computer-readable medium described herein may further include processes, features, means, or instructions for transmitting a request for a quality report to the second mobile device, and receiving the quality report from the second mobile device in response to the request. Additionally or alternatively, some examples may include processes, features, means, or instructions for determining that a sidelink between the first mobile device and second mobile device satisfies a criterion for communication using the first duration TTI, wherein the sidelink initiation signal is transmitted based at least in part on the determination that the sidelink satisfies the criterion.

In some examples of the method, apparatuses, or non-transitory computer-readable medium described herein, the downlink control message comprises a time resource allocation, demodulation reference signal (DMRS) cyclic shift information, a transmit power control parameter, a frequency hopping parameter, or a resource block allocation, or any combination thereof. Additionally or alternatively, in some examples the time resource allocation comprises the indication of the pattern for the sequence of data and reference signal transmissions.

In some examples of the method, apparatuses, or non-transitory computer-readable medium described herein, the sequence comprises a set of first duration TTIs, and wherein each TTI of the set of first duration TTIs comprises a symbol period and may include either data or a reference signal. Additionally or alternatively, in some examples the downlink control message is transmitted during the second duration TTI.

BRIEF DESCRIPTION OF THE DRAWINGS

Aspects of the disclosure are described in reference to the following figures.

DETAILED DESCRIPTION

Figure 1:
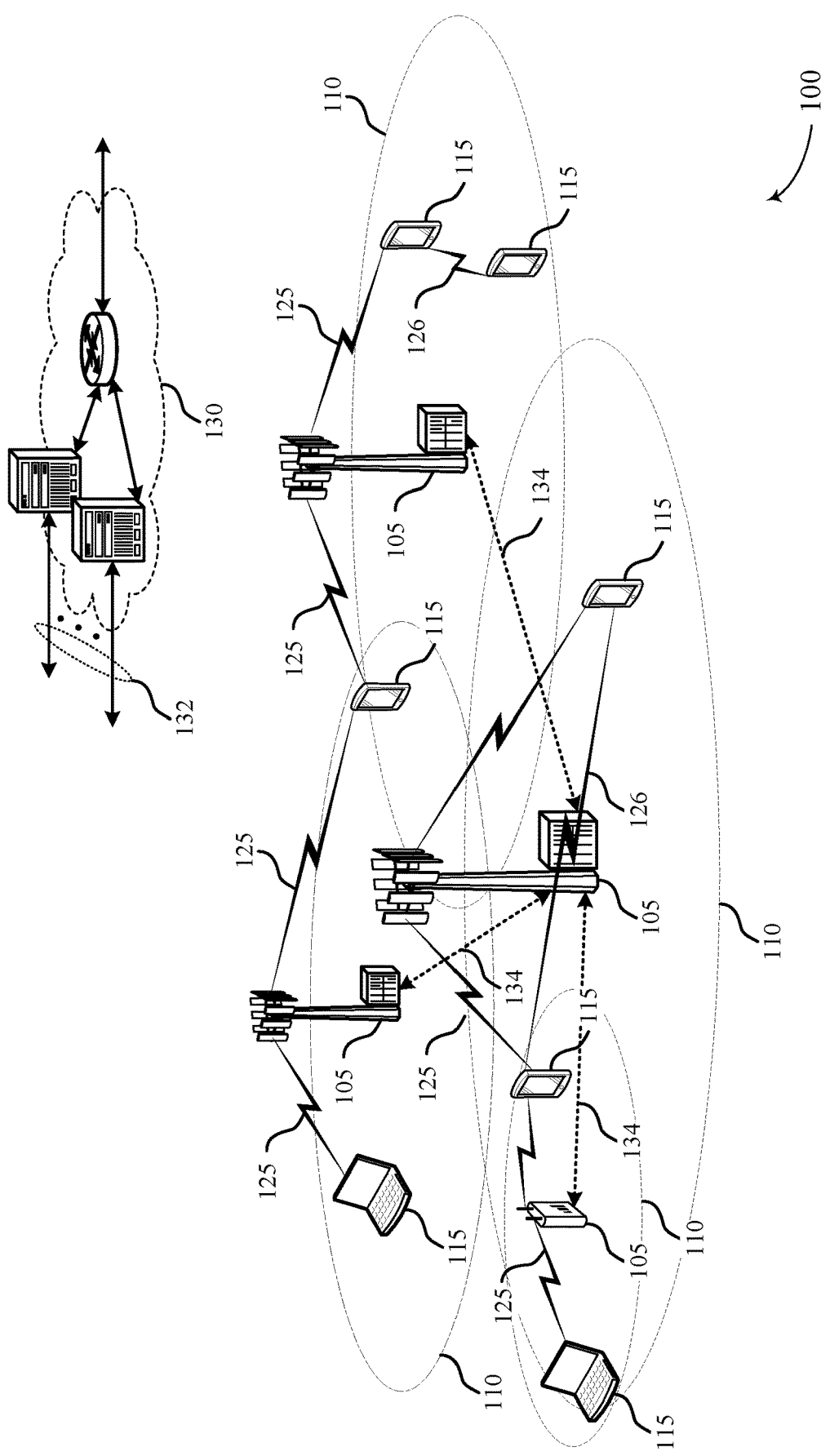
FIG. 1 illustrates an example of a wireless communications system that supports low latency communication in accordance with various aspects of the present disclosure.

Some wireless systems may support device-to-device (D2D) communication among devices, which may enable user equipment (UEs) to communicate directly with each other without an intermediate connection to a central device, such as a base station. Systems may support low-latency D2D communications by, for example, employing a pattern known or recognized by devices within the system. Additionally, systems may employ a pattern known among devices within the system for communication between UEs and base stations, which may help reduce latency as compared with other uplink and downlink communication schemes. Accordingly, the techniques described herein are discussed largely in the context of D2D communications, but these techniques are applicable to, and may likewise be beneficial for, uplink or downlink communications.

In D2D, one UE may be known as a transmitting UE and another UE may be known as a receiving UE. In some cases, a D2D structure for communication among UEs may include control information signaled by a base station. For example, a transmitting UE may receive downlink control information (DCI) from a base station, and the DCI may include control information—including a pattern for data and reference signal transmissions—that supports D2D communication with a receiving UE. The transmitting UE may send sidelink control information (SCI) to a receiving UE configured by higher layers to monitor for this information. After configuration of data transmission, a transmitting UE may transmit using a primary sidelink shared channel (PSSCH). Resource block allocation may come from the original DCI format grant and may be replicated in SCI format grant from the transmitting UE. The receiving UE may configure PSSCH based on reception of SCI.

In some cases, reducing the latency of transmissions that support the D2D communication link—i.e., employing low-latency D2D techniques—may increase data throughput. These transmissions may include: transmission of the DCI format grant information from a base station to a transmitting UE, transmission of the primary sidelink control channel (PSCCH) SCI format grant information by a transmitting UE to a receiving UE, and transmission of the PSSCH data by a transmitting UE to a receiving UE. These transmissions may be modified so that they are efficiently handled within the low latency framework. This may include modifying payloads, handling demodulation reference signal (DMRS) transmission, and consolidating control and data transmission to reduce overall latency.

Systems, including those described herein, may support low latency D2D by using a low latency physical downlink control channel (uPDCCH) version of a DCI format grant. This may include conveying information for a transmitting UE to send low latency PSCCH (uPSCCH) control and low latency PSSCH (uPSSCH) data. In some cases, uPSCCH control data may be integrated or multiplexed with uPSSCH data, which may be similar to integrating uPDCCH with uPDSCH. Additionally, reference signal (e.g., demodulation reference signal (DMRS) usage and number of retransmissions, including mapping to a set of known patterns of data and DMRS symbols, may be indicated with uPSCCH.

In some cases, systems may employ a uPDCCH grant type or types to handle base station scheduling of D2D traffic. Payload for contents this type of grant may also be simplified for a low latency process. For example, hopping, sidelink shared channel resource block (RB) allocation (where allocation mapping may be the same as low latency physical uplink shared channel (uPUSCH)), time resource allocation, DMRS cyclic shift information, and transmit power control (TPC) (e.g., for open loop power control) may be indicated as necessary for low latency operation.

As described below, uPSCCH or uPSSCH resource allocation may be defined, using a higher layer, with a given time periodicity and frequency allocation. On reception of a low latency format grant on the uPDCCH, a transmitting UE may begin the uPSCCH or uPSSCH transmission at the start of the next data resource allocation. As for uPSCCH control information, a payload may contain information including: resource block assignment (e.g., in similar format to allocating uPUSCH uplink data transmission), modulation and coding scheme (MCS), timing advance (e.g., for base station scheduled D2D transmission, the timing advance may equal the transmitting UE timing advance value), a group destination identifier (ID) (e.g., for intended receiving UEs), and time resource allocation (e.g., modified for low latency processes). In some cases, uPSCCH payload may be interleaved within a uPUSCH block. For example, a receiving UE within the D2D resource pool may perform a blind decode to determine whether a uPSCCH has been transmitted. On successful reception of the data, a receiving UE may extract uPSSCH based on the parameters included in the uPSCCH control information.

Systems may activate or deactivate a low latency D2D mode of operation according to conditions or user needs within the system. During normal D2D discovery operation mode, both users may sense each other's signals. For example, signal strength may be estimated using Received Signal Strength Indicator (RSSI) or a Signal to Noise Ratio (SNR) and may be registered by each UE and signaled back to a base station. The base station may report measured signal strengths back to the transmitting UE. The transmitting UE may inform the base station of desired receiving UEs, and the base station may periodically sample the link quality of the receiving UE. Based on the D2D link quality, the base station may determine whether low latency D2D operation will be suitable for the links. Additionally, the base station may determine if signal strength measures meet a desired threshold to determine whether a low latency mode of operation is suitable. The base station can then activate the low latency D2D mode of operation for the transmitting UE and the receiving UE if the desired thresholds have been met.

Aspects of the disclosure discussed above are further described below in the context of a wireless communication system. Specific examples are then described for creating sidelinks among UEs for D2D communication, determining and indicating patterns of data and reference signals for transmission for low latency operation, and decoding received transmissions based on the pattern. Some specific transmission patterns are described as well. These and other aspects of the disclosure are further illustrated by and described with reference to apparatus diagrams, system diagrams, and flowcharts that relate to low latency communication.

FIG. 1 illustrates an example of a wireless communications system 100 that supports low latency D2D communication in accordance with various aspects of the present disclosure. The wireless communications system 100 includes base stations 105, user equipment (UEs) 115, and a core network 130. In some examples, the wireless communications system 100 may be a Long Term Evolution (LTE)/

LTE-Advanced (LTE-A) network. Wireless communications system 100 may support low latency device-to-device (D2D) communications between one or more UEs 115. For example, UEs 115 may transmit low latency D2D messages according to predefined data and reference signal patterns.

Base stations 105 may wirelessly communicate with UEs 115 via one or more base station antennas. Each base station 105 may provide communication coverage for a respective geographic coverage area 110. Communication links 125 shown in wireless communications system 100 may include uplink (UL) transmissions from a UE 115 to a base station 105, or downlink (DL) transmissions, from a base station 105 to a UE 115. UEs 115 may be dispersed throughout the wireless communications system 100, and each UE 115 may be stationary or mobile. A UE 115 may also be referred to as a mobile station, a subscriber station, a remote unit, a wireless device, an access terminal, a handset, a user agent, a client, or some other suitable terminology. A UE 115 may also be a cellular phone, a wireless modem, a handheld device, a personal computer, a tablet, a personal electronic device, a machine type communication (MTC) device or the like.

Base stations 105 may communicate with the core network 130 and with one another. For example, base stations 105 may interface with the core network 130 through backhaul links 132 (e.g., S1, etc.). Base stations 105 may communicate with one another over backhaul links 134 (e.g., X2, etc.) either directly or indirectly (e.g., through core network 130). Base stations 105 may perform radio configuration and scheduling for communication with UEs 115, or may operate under the control of a base station controller (not shown). In some examples, base stations 105 may be macro cells, small cells, hot spots, or the like. Base stations 105 may also be referred to as eNodeBs (eNBs) 105.

Wireless communication links 126, which may be referred to as sidelinks, may also be established between UEs 115 in a configuration known as device-to-device (D2D) communications. One or more of a group of UEs 115 utilizing D2D communications may be within the geographic coverage area 110 of a cell. Other UEs 115 in such a group may be outside the coverage area 110 of a cell, or otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out independent of a base station 105.

A UE 115 attempting to access a wireless network may perform an initial cell search by detecting a primary synchronization signal (PSS) from a base station 105. The PSS may enable synchronization of slot timing and may indicate a physical layer identity value. The UE 115 may then receive a secondary synchronization signal (SSS). The SSS may enable radio frame synchronization, and may provide a cell identity value, which may be combined with the physical layer identity value to identify the cell. The SSS may also enable detection of a duplexing mode and a cyclic prefix length. Some systems, such as time division duplex (TDD) systems, may transmit an SSS but not a PSS. Both the PSS and the SSS may be located in the central 62 and 72 subcarriers of a carrier, respectively. After receiving the PSS and SSS, the UE 115 may receive a master information block (MIB), which may be transmitted in the physical broadcast channel (PBCH). The MIB may contain system bandwidth information, a system frame number (SFN), and a physical HARQ indicator channel (PHICH) configuration. After decoding the MIB, the UE 115 may receive one or more system information block (SIBs). For example, SIB1 may contain cell access parameters and scheduling information for other SIBs. Decoding SIB1 may enable the UE 115 to receive SIB2. SIB2 may contain radio resource control (RRC) configuration information related to random access channel (RACH) procedures, paging, physical uplink control channel (PUCCH), physical uplink shared channel (PUSCH), power control, SRS, and cell barring. In some cases, discovery and synchronization resources may be chosen or modified to support low latency PUSCH (uP-USCH).

A frame structure may be used to organize physical resources. A frame may be a 10 ms interval that may be further divided into 10 equally sized sub-frames. Each sub-frame may include two consecutive time slots. Each slot may include 6 or 7 orthogonal frequency division multiple access (OFDMA) symbol periods. A resource element consists of one symbol period and one subcarrier (a 15 KHz frequency range). A resource block may contain 12 consecutive subcarriers in the frequency domain and, for a normal cyclic prefix in each OFDM symbol, 7 consecutive OFDM symbols in the time domain (1 slot), or 84 resource elements. Some resource elements may include DL reference signals (DL-RS). The DL-RS may include a cell-specific reference signals (CRS) and a UE-specific RS (UE-RS), which may also be referred to as demodulation reference signals (DMRS). UE-RS may be transmitted on the resource blocks associated with PDSCH. The number of bits carried by each resource element may depend on the modulation scheme (the configuration of symbols that may be selected during each symbol period). Thus, the more resource blocks that a UE receives and the higher the modulation scheme, the higher the data rate may be. In some cases, various patterns of reference symbols and data symbols in a transmission for D2D communication may exist, and a base station may signal which pattern to use, or a UE may choose which pattern to use.

In some cases, a subframe may be the basic unit of scheduling, known as the TTI. In other cases, such as with low latency operation, a different TTI may be used, such as a symbol period, a pair of symbol periods, or a slot (i.e., half of a subframe). TTIs for low latency operation may thus have a numerology that is compatible with other LTE transmission structures and timing (e.g., subframe). The wireless communications system 100 may concurrently support communication using TTIs over different duration (e.g., TTIs having a duration of a subframe and TTIs having a duration of a symbol period or a slot).

Data may be divided into logical channels, transport channels, and physical layer channels. Channels may also be classified into Control Channels and Traffic Channels. Logical control channels may include paging control channel (PCCH) for paging information, broadcast control channel (BCCH) for broadcast system control information, multicast control channel (MCCH) for transmitting multimedia broadcast multicast service (MBMS) scheduling and control information, dedicated control channel (DCCH) for transmitting dedicated control information, common control channel (CCCH) for random access information, DTCH for dedicated UE data, and multicast traffic channel (MTCH), for multicast data. downlink (DL) transport channels may include broadcast channel (BCH) for broadcast information, a downlink shared channel (DL-SCH) for data transfer, paging channel (PCH) for paging information, and multicast channel (MCH) for multicast transmissions. uplink (UL)

transport channels may include RACH for access and uplink shared channel (UL-SCH) for data. DL physical channels may include PBCH for broadcast information, physical control format indicator channel (PCFICH) for control format information, physical downlink control channel (PDCCH) for control and scheduling information, PHICH for hybrid automatic repeat request (HARQ) status messages, physical downlink shared channel (PDSCH) for user data and physical multicast channel (PMCH) for multicast data. UL physical channels may include physical random access channel (PRACH) for access messages, PUCCH for control data, and PUSCH for user data. In some cases, UEs may directly communicate with each other on a sidelink channel using the sidelink physical channels described above. Certain physical channels, including those mentioned above, may support low latency operation.

PDCCH carries downlink control information (DCI) in control channel elements (CCEs), which may consist of nine logically contiguous resource element groups (REGs), where each REG contains 4 resource elements (REs). DCI includes information regarding DL scheduling assignments, UL resource grants, transmission scheme, UL power control, HARQ information, modulation and coding scheme (MCS) and other information. The size and format of the DCI messages can differ depending on the type and amount of information that is carried by the DCI. For example, if spatial multiplexing is supported, the size of the DCI message is large compared to contiguous frequency allocations. Similarly, for a system that employs multiple input multiple output (MIMO), the DCI must include additional signaling information. DCI size and format depend on the amount of information as well as factors such as bandwidth, the number of antenna ports, and duplexing mode. A particular DCI format may be employed to initiate low latency communications, for example. In some cases, PSCCH for D2D communication may be based on PDCCH received from a base station 105.

A base station 105 may transmit DMRS (also referred to as UE-RS) to specific UEs 115 and may be transmitted only on resource blocks assigned to those UEs 115. DMRS may include signals on six resource elements in each resource block in which they are transmitted. The DMRS for different antenna ports may each utilize the same six resource elements, and may be distinguished using different orthogonal cover codes (e.g., masking each signal with a different combination of 1 or −1 in different resource elements). In some cases, two sets of DMRS may be transmitted in adjoining resource elements. In some cases, the transmission patterns for D2D communication may involve DMRS symbols.

A UE 115 may coordinate transmit power with a serving base station to mitigate interference, improve the UL data rate, and prolong battery life. Uplink power control may include a combination of open-loop and closed-loop mechanisms. In open-loop power control the UE transmit power depends on estimates of the downlink path-loss and channel configuration. In closed-loop power control that the network can directly control the UE transmit power using explicit power-control commands. Open-loop power control may be used for initial access, whereas both open and closed loop control may be used for UL control and data transmission. A UE 115 may determine power using an algorithm that takes into account a maximum transmission power limit, a target base station receive power, path loss, modulation and coding scheme (MCS), the number of resources used for transmission, and the format of the transmitted data (e.g., physical UL control channel (PUCCH) format). Power adjustments may be made by a base station 105 using a transmit power command (TPC) messages, which may incrementally adjust the transmit power of a UE 115 as appropriate. TPC for D2D communications may be conveyed in D2D-specific DCI or in SCI, or both.

In some cases, a wireless communications system may utilize one or more enhanced component carriers (ECCs). An ECC may be characterized by features including: flexible bandwidth, variable length TTIs, and modified control channel configuration. In some cases, an ECC may be associated with a carrier aggregation configuration or a dual connectivity configuration (i.e., when multiple serving cells have a suboptimal backhaul link). An ECC may also be configured for use in unlicensed spectrum or shared spectrum (where more than one operator is licensed to use the spectrum). An ECC characterized by flexible bandwidth may include one or more segments that may be utilized by UEs 115 that do are not capable of monitoring the whole bandwidth or prefer to use a limited bandwidth (e.g., to conserve power).

Thus, wireless communications system 100 may support low latency communication based on using multiple predefined patterns of data and reference signals. For example, a base station 105 may initiate a sidelink between two UEs 115 based on a quality report, such as a report that indicates a quality of a sidelink between two UEs 115. The base station 105 may send a downlink control message indicating a transmission pattern selected from the set of patterns. The transmitting UE 115 may send a sidelink control message indicating the transmission pattern to the receiving UE 115 and may then send the sequence of data and reference signals based on the pattern. The receiving UE 115 may identify the pattern based on the received indicator and decode the sequence of data and reference signals based on the pattern. In some examples, the sequence may include a set of first, relatively short duration TTIs (e.g., 2 ms, 1 slot, etc.), while the wireless communications system 100 may support operation on TTIs of different durations (e.g., 10 ms, 5 ms, 2 ms, 1 ms, etc.), that each include either a data or a reference signal.

Figure 2:
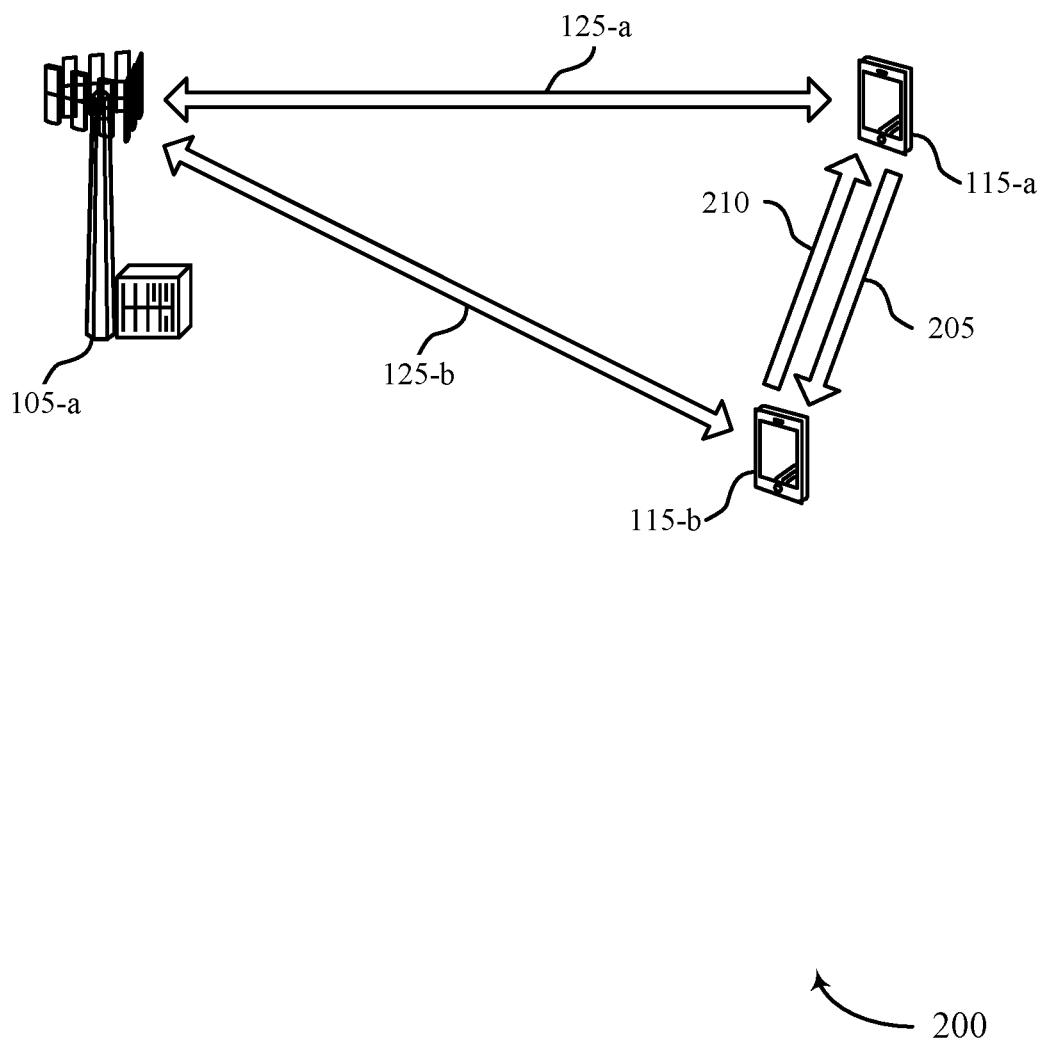
FIG. 2 illustrates an example of a wireless communications system that supports low latency communication in accordance with various aspects of the present disclosure.

FIG. 2 illustrates an example of a wireless communications system 200 that supports low latency communication in accordance with various aspects of the present disclosure. Wireless communications system 200 may include a UE 115-a and base station 105-a, which may be examples of a UE 115 base station 105 described with reference to FIG. 1. Wireless communications system 200 may support low latency D2D communication and low latency peer-to-peer communication between UE 115-a and UE 115-b. UE 115-a may be referred to as a transmitting UE and UE 115-b may be referred to as a receiving UE. UE 115-a may be connected to base station 105-a by communication link 125-a. In some cases, UE 115-b may be communicate with base station 105-a through communication link 125-b. UE 115-a may configured to perform D2D communications with UE 115-b through sidelink 205. In some cases, UE 115-b may transmit to UE 115-a through sidelink 210.

Establishing a D2D connection may include a discovery process and a synchronization process. By way of example, the discovery process includes configuration of user timing or periodicity of discovery periods, payload content and sizing, and structure of subframe-based Tx/Rx resource pools. A choice of frequency-hopped discovery resource allocation may allow for efficient use of low latency PUSCH (uPUSCH) resources during discovery period windows.

The synchronization process may include configuration of primary sidelink synchronization signals or secondary sidelink synchronization signals (PSSS/SSSS), physical shared broadcast channel (PSBCH) payload content, and 40 ms periodicity and timing. The synchronization process may support UE 115-*a* transmitting synchronization signals prior to discovery transmission. For example, UE 115-*a* may transmit synchronization signals to base station 105-*a* prior to discovery transmission. In some cases, a synchronization resource (e.g., 6 resource blocks) may be efficiently aligned with uPUSCH resource allocation.

A D2D structure for communication between UE 115-*a* and UE 115-*b* may include transmissions scheduled by base station 105-*a*. The transmission from base station 105-*a* may include a PDCCH DCI format (e.g., a D2D DCI Format 5), indicating hopping characteristics and RB allocation (e.g., for a sidelink shared channel). This transmission may also include time allocation bitmask (T-RPT), transmit power control (TPC) (e.g., for open loop power control), and control resource allocation (e.g., mapping to usable subframes for PSCCH). Additionally, UE 115-*a* may listen to base station 105-*a* using a sidelink radio network temporary identifier (SL-RNTI).

UE 115-*a* may receive DCI and may transmit PSCCH to UE 115-*b*. Resources for PSCCH may be configured using information communicated from base station 105-*a* and conveyed between UEs 115 with higher layer signaling. For example, as for time, an offset and periodicity of subframe transmission relative to frame time may be configured, and, as for frequency, a set of RBs that define a control resource pool may be conveyed by higher layers. The PSCCH payload may be sent based on computed RB control assignments. In some cases, the RB transmission may be repeated once using frequency hopping with a defined time and frequency pattern. The PSCCH may contain sidelink control information (SCI) format payload contents (e.g., for Format 0), which may include a destination ID specifying intended receiving UEs (e.g., UE 115-*b*), frequency resource allocation, hopping enabled flag, time allocation bitmask, master control system (MCS) and timing advance (e.g., UE 115-*a* sets may be based on its uplink timing). In some cases, the above information may be copied from a DCI format grant.

UE 115-*b* may be configured by higher layers to monitor for matching destination ID in the PSCCH control region. UE 115-*a* may configure data transmission and transmit using a PSSCH. Resources for PSSCH may be configured by higher layer signaling and time resources may directly follow PSCCH. For example, a multiple of four transmissions/retransmissions may be made and scheduled on subframes that may be determined by the time resource bit mask. RB allocation may come from the original DCI format grant, and may be replicated in SCI format grant from the UE 115-*a*. UE 115-*b* may configure PSSCH based on reception of SCI format.

Transmissions that support the D2D communication link may be sent while devices operate in a low latency mode. These transmissions may include: transmission of the DCI format grant information from base station 105-*a* to UE 115-*a*, transmission of the PSCCH SCI format grant information by UE 115-*a* to UE 115-*b*, and transmission of the PSSCH data by UE 115-*a* to UE 115-*b*. These transmissions may be designed to support low latency operation. This may include modified payloads, DMRS handling, and consolidated control and data transmission, as compared with other transmissions, which may reduce overall latency. Additionally, a low latency operation, in some examples, may employ a two-symbol TTI and a 25 RB uPUSCH assignment requiring four bit allocation assignments.

As mentioned above, certain DCI formats may be used to support low latency operation, which may include a uPDCCH version of a DCI format grant. For example, information for UE 115-*a* to send uPSCCH control and uPSSCH data may be conveyed in a low latency D2D DCI format. In some cases, uPSCCH (i.e., low latency control) is integrated (e.g., interleaved) with uPSSCH (i.e., low latency data). A low latency DCI format may also convey DMRS usage and a number of transmissions or retransmissions of data, including mapping to a set of known patterns of data and DMRS symbols. Various patterns of data and resource signal sequences may be selected from a set of patterns known to devices in the wireless communications system 200, for instance. Not all patterns are necessarily of the same length. By way of example, patterns may be two TTIs or six TTIs (e.g., two symbols or six symbols) in duration, as illustrated:

$$\text{Pattern } A = DMRS + \text{Data} \tag{1}$$

$$\text{Pattern } B = DMRS + \text{Data} + \text{Data} + DMRS + \text{Data} \tag{2}$$

Pattern A may convey one DMRS symbol followed by a symbol containing uPSCCH or uPSSCH data. Pattern B may include a first symbol containing DMRS, a second symbol containing integrated uPSCCH or uPSSCH data, a third and fourth symbol containing uPSSCH 1st and 2nd retransmission, a fifth symbol containing DMRS, and a sixth symbol containing uPSSCH 3rd retransmission. Other patterns and other lengths of patterns may also be used.

An additional or different uPDCCH grant type may be employed for base station 105-*a* scheduling of D2D traffic. Payload contents may be simplified for a low latency process. For example, hopping, sidelink shared channel RB allocation (e.g., where allocation mapping may be the same as uPUSCH), time resource allocation, DMRS cyclic shift information, and TPC (e.g., for open loop power control) may be included as may be beneficial for low latency operation. Time resource allocation may include mapping to a pattern of data and DMRS symbols and identifying a location of pilot tones relative to data, the proportion of pilot tones to data tones, and the number of retransmissions.

uPSCCH or uPSSCH resource allocation may be defined, using a higher layer, with a given time periodicity and frequency allocation. On reception of a low latency format grant on the uPDCCH, UE 115-*a* may begin the uPSCCH or uPSSCH transmission at the start of the next data resource allocation. For uPSCCH control information, a payload may contain information including: resource block assignment (e.g., in similar format to allocating uPUSCH uplink data transmission), MCS, timing advance (e.g., for base station 105-*a* scheduled D2D transmission, the timing advance may equal the UE 115-*a* TA value), group destination ID (e.g., for intended receiving UEs), and time resource allocation (e.g., modified for low latency processes). In some cases, uPSCCH payload may be interleaved within a uPUSCH block. For example, UE 115-*b* receiving within the D2D resource pool may perform a blind decode to determine whether a uPSCCH has been transmitted. On successful reception of the data, UE 115-*b* may extract uPSSCH based on the parameters included in the uPSCCH control information.

As introduced above, a low latency D2D operation mode may be activated or deactivated. During a D2D discovery operation mode, both users may sense each other's signals. For example, signal strength may be estimated using RSSI or a SNR and may be registered by UE 115-*a* and UE 115-*b* and signaled back to base station 105-*a*. Base station 105-*a* may report measured signal strengths back to UE 115-*a*. UE 115-*a* may inform base station 105-*a* of desired receiving UEs (e.g., UE 115-*b*), and base station 105-*a* may periodically sample the link quality of UE 115-*b*. Based on the D2D link quality (i.e., sidelink channel quality), base station 105-*a* may determine whether low latency D2D operation will be suitable for the links. Additionally, base station 105-*a* can determine if signal strength measures meet a desired threshold to determine whether a low latency mode of operation is suitable. Base station 105-*a* may then activate the low latency D2D mode of operation for UE 115-*a* and UE 115-*b* if the desired thresholds have been met.

In some examples, system 200 may use a low latency DCI format to schedule resources for communications between a base station 105 and UE 115. Base station 105-*a* may send transmit a control message (e.g., uPDCCH) to schedule low latency communications with UE 115-*a*. For example, information for UE 115-*a* to send uplink control or data (e.g., uPUCCH or uPDSCH) via communication link 125-*a* may be conveyed in a low latency DCI format from base station 105-*a* via link 125-*a*. A low latency DCI format may also convey DMRS usage and a number of transmissions or retransmissions of data, including mapping to a set of known patterns of data and DMRS symbols. As discussed above in the D2D context, various patterns of data and resource signal sequences may be selected from a set of patterns known to devices in the wireless communications system 200. Pattern A and Pattern B discussed above are examples of such.

Figure 3A:
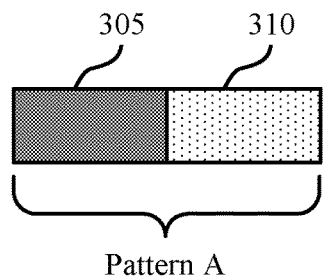
FIG. 3A and FIG. 3B illustrate examples of symbol mapping of transmissions in a system that supports low latency communication in accordance with various aspects of the present disclosure.
Figure 3A:
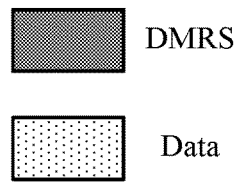
Figure 3B:
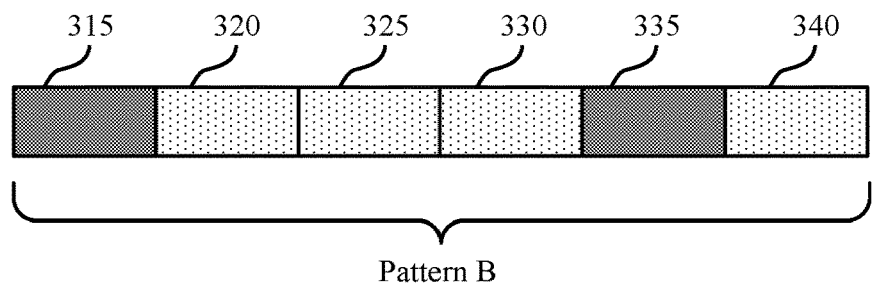
Figure 3B:
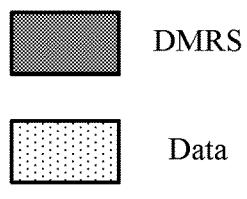

FIGS. 3A and FIG. 3B illustrate examples of symbol mapping 300 that supports low latency communication in accordance with various aspects of the present disclosure. Symbol mapping 300 may include symbols that consist of DMRS, uPSCCH data, or uPSSCH data, or retransmissions.

Symbol mapping 300-*a* in FIG. 3A may represent a pattern of DMRS and data symbols mapped for low latency operation. Block 305 may represent a DMRS symbol and Block 310 may represent a uPSCCH or uPSSCH data symbol. This pattern may be repeated, in some cases.

Symbol mapping 300-*b* in FIG. 3B may represent a pattern of DMRS and data symbols mapped for low latency operation. Block 315 may represent a first symbol that may contain DMRS. Block 320 may represent a second symbol containing integrated uPSCCH or uPSSCH data. Block 325 may represent a third symbol that may contain a uPSSCH first retransmission. Block 330 may represent a fourth symbol that may contain uPSSCH second retransmission. Block 335 may represent a fifth symbol that may contain DMRS. Block 340 may represent a sixth symbol that may contain a uPSSCH 3rd retransmission.

Figure 4:
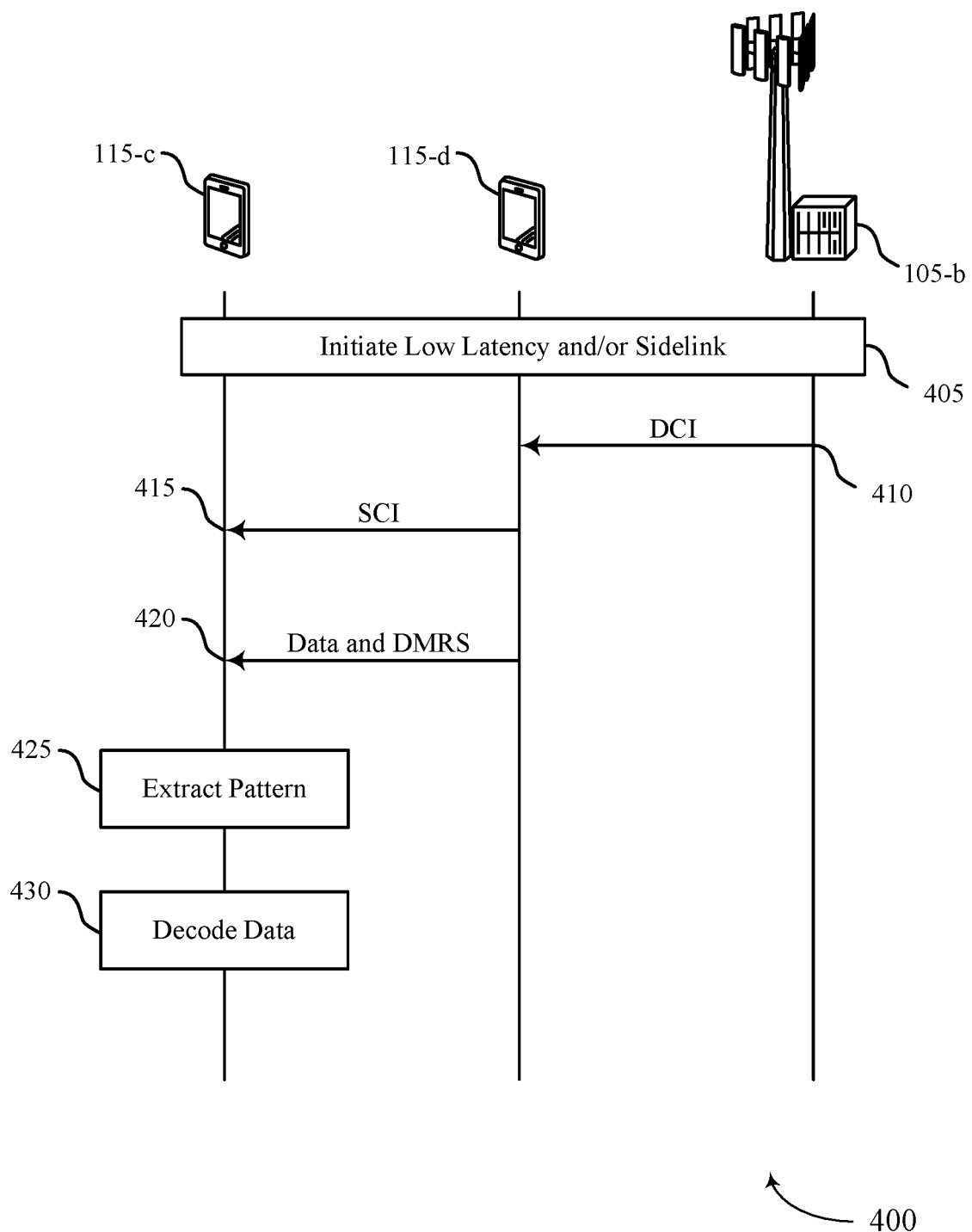
FIG. 4 illustrates an example of a process flow in a system that supports low latency communication in accordance with various aspects of the present disclosure.

FIG. 4 illustrates an example of a process flow 400 in a system that supports low latency communication in accordance with various aspects of the present disclosure. Process flow 400 may include a UE 115-*c*, a UE 115-*d*, and base station 105-*b*, which may be examples of a UE 115 and base station 105 described with reference to FIGS. 1-2. UE 115-*d* may be known as a transmitting UE and UE 115-*c* may be known as a receiving UE. UE 115-*c* and 115-*d* may communicate directly over a sidelink configured for low latency operation. UE 115-*d* may receive DCI from base station 105-*b* and may then send SCI to UE 115-*c* based on the received DCI. UE 115-*d* may then transmit data and DMRS to UE 115-*c* according to a chosen pattern, which may be indicated by base station 105-*b*.

At 405, UE 115-*c*, UE 115-*d*, and base station 105-*b* may initiate low latency communication, which may include initiating low latency mode or a sidelink, or both. Base station 105-*b* may transmit a sidelink initiation signal to UE 115-*c* and to UE 115-*d*. In some cases, UE 115-*d* may transmit a synchronization or discovery signal during the second duration TTI, such that the sidelink control message may be transmitted during the first duration TTI. UE 115-*d* may establish a sidelink connection with UE 115-*c* based on the synchronization or discovery signal, such that the sidelink control message may be transmitted to UE 115-*c*. Accordingly, UE 115-*c* may receive a synchronization or discovery signal during the second duration TTI, such that the sidelink control message may be received during the first duration TTI; and UE 115-*c* may establish a sidelink connection with UE 115-*d* based on the synchronization or discovery signal so the sidelink control message may be received from UE 115-*d*.

Additionally, at 405, UE 115-*d* may transmit to base station 105-*b* signaling indicative of a desired mobile device (e.g., UE 115-*c*) for a sidelink connection. In some cases, base station 105-*b* may transmit a request for a quality report (e.g., a sidelink quality report) to UE 115-*c*. Base station 105-*b* may receive the quality report from UE 115-*c* in response to the request. Accordingly, UE 115-*c* may receive from a base station a request for a quality report and UE 115-*c* may transmit the quality report to base station 105-*b* in response to the request. Base station 105-*b* may determine that a sidelink between UE 115-*c* and UE 115-*d* satisfies a criterion for communication using the first duration TTI, such that the sidelink initiation signal may be transmitted based on the determination that the sidelink satisfies the criterion. UE 115-*d* may receive a confirmation message for the sidelink connection from base station 105-*b* in response to the signaling, such that the sidelink control message may be transmitted using the sidelink connection with UE 115-*c*. Accordingly, UE 115-*c* may receive an indication from the base station to operate using the first duration TTI, such that the indication may be responsive to the quality report. In some examples the confirmation message may be based on UE 115-*c* having a link quality above a threshold. In some examples, the confirmation message includes an estimated signal strength associated with UE 115-*c*.

At 410, base station 105-*b* may send DCI to UE 115-*d*. Base station 105-*b* may determine a pattern corresponding to a sequence of data and reference signal transmissions from UE 115-*d* (e.g., transmission to UE 115-*c* or base station 105-*b*), where the sequence uses the first duration TTI. The sequence may be a set of first duration TTIs and each TTI of the set of first duration TTIs includes either data or a reference signal. In some examples, each TTI of the set of first duration TTIs may be a symbol period. Base station 105-*b* may transmit a downlink control message to UE 115-*d*, where the downlink control message includes an indicator of the pattern. Accordingly, UE 115-*d* may receive a downlink control message including an indicator of a pattern, corresponding to a sequence of data and reference signal transmissions that use the first duration TTI. The downlink control message may include time resource allocation, DMRS cyclic shift information, a transmit power control parameter, a frequency hopping parameter, a resource block allocation, or the like. In some cases, the time resource allocation includes the indication of the pattern for the sequence of data and reference signal transmissions. The sequence may include a set of first duration TTIs, where each TTI of the set of first duration TTIs may be a symbol period in duration and include either data or a reference signal. In some examples, the downlink control message may be transmitted during the second duration TTI.

At 415, transmitting UE 115-*d* may send SCI to UE 115-*c*. UE 115-*d* may identify the pattern based on the indicator received from base station 105-*b*. In some examples, identifying the pattern includes selecting the pattern from a predetermined set of patterns based at least in part on the indicator. UE 115-*d* may transmit a sidelink control message including the indicator. In some cases, a data symbol of the sequence includes the sidelink control message. The sequence of data and reference signal transmissions may include two or more TTIs corresponding to data retransmissions. In some examples, the sidelink control message includes a resource block assignment, an MCS, a timing advance, a group destination ID, or a time resource allocation, or any combination. Or in some examples, UE 115-*d* may communicate with other UEs 115 or base stations 105 according to the pattern. For instance, UE 115-*d* may transmit a sequence of data and references signal to the base station according to the pattern.

At 420, transmitting UE 115-*d* may send data and DMRS symbols to UE 115-*c*. UE 115-*d* may transmit the sequence of data and reference signals based on the pattern.

At 425, UE 115-*c* may extract the pattern based on the information sent by UE 115-*d*. UE 115-*c* may identify the pattern corresponding to the sequence of data and reference signal transmissions that use the first duration TTI based on the indicator received in the sidelink control message. In some examples, identifying the pattern includes selecting the pattern from a predetermined set of patterns based on the indicator.

At 430, UE 115-*c* may decode the sequence of data and reference signal transmissions using the pattern.

Figure 5:
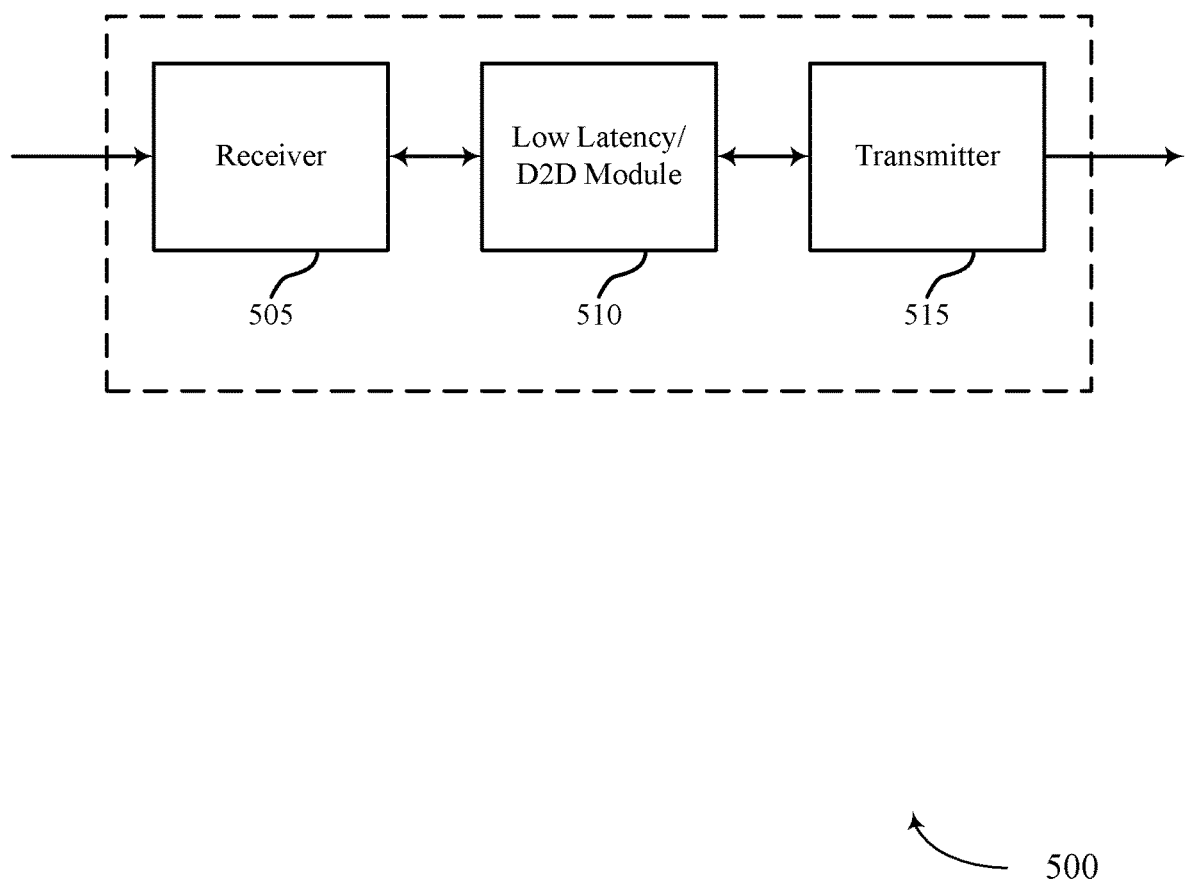
FIGS. 5-7 show block diagrams of a wireless device or devices that support low latency communication in accordance with various aspects of the present disclosure.

FIG. 5 shows a block diagram of a wireless device 500 that supports low latency communication in accordance with various aspects of the present disclosure. Wireless device 500 may be an example of aspects of a UE 115 described with reference to FIGS. 1-4. Wireless device 500 may include a receiver 505, a low latency/D2D module 510, or a transmitter 515. Wireless device 500 may also include a processor. Each of these components may be in communication with one another. Wireless device 500 may operate in a system that supports a first duration TTI and a second, longer duration TTI.

The receiver 505 may receive information such as packets, user data, or control information associated with various information channels (e.g., control channels, data channels, and information related to low latency and/or device-to-device communication, etc.). Information may be passed on to the low latency/D2D module 510, and to other components of wireless device 500. The receiver 505 may, for example, receive DCI as described with reference to FIG. 4 at 410.

The low latency/D2D module 510 may, in combination with receiver 505, receive a sidelink control message that includes an indicator of a pattern corresponding to a sequence of data and reference signal transmissions that use the first duration TTI, identify the pattern based at least in part on the indicator, and decode the sequence of data and reference signal transmissions using the pattern. The receiver 505 and low latency/D2D module 510 may receive the SCI as described with reference to FIG. 4 at 420.

The transmitter 515 may transmit signals received from other components of wireless device 500. In some examples, the transmitter 515 may be collocated with the receiver 505 in a transceiver. The transmitter 515 may include a single antenna, or it may include a plurality of antennas. In some examples, the transmitter 515 may transmit a sidelink control message, which may include the indicator and may transmit the sequence of data and reference signals based at least in part on the pattern. The transmitter 515 may, for example, transmit SCI as described with reference to FIG. 4 at 420.

Figure 6:
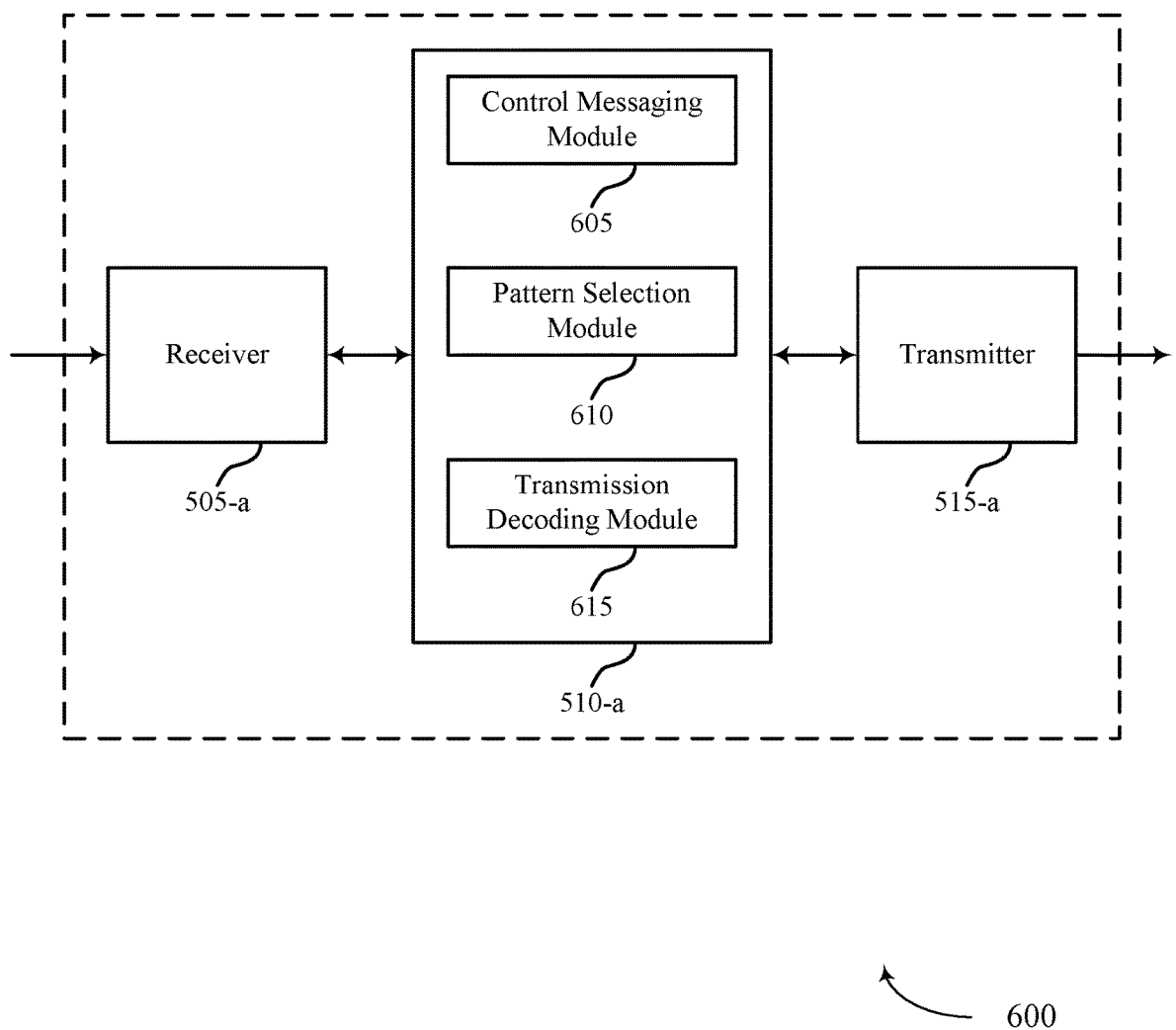

FIG. 6 shows a block diagram of a wireless device 600 for low latency communication in accordance with various aspects of the present disclosure. Wireless device 600 may be an example of aspects of a wireless device 500 or a UE 115 described with reference to FIGS. 1-5. Wireless device 600 may include a receiver 505-*a*, a low latency/D2D module 510-*a*, or a transmitter 515-*a*. Wireless device 600 may also include a processor. Each of these components may be in communication with one another. Wireless device 600 may operate in a system that supports a first duration TTI and a second, longer duration TTI. The low latency/D2D module 510-*a* may also include a control messaging module 605, a pattern selection module 610, and a transmission decoding module 615.

The receiver 505-*a* may receive information, which may be passed on to low latency/D2D module 510-*a*, and to other components of wireless device 600. The low latency/D2D module 510-*a* may perform the operations described with reference to FIG. 5. The transmitter 515-*a* may transmit signals received from other components of wireless device 600.

The control messaging module 605 may receive a sidelink control message including an indicator of a pattern corresponding to a sequence of data and reference signal transmissions that use the first duration TTI as described with reference to FIGS. 2-4. In some examples, the sequence includes a set of first duration TTIs, where each TTI of the set of first duration TTIs contains either data or a reference signal. In some examples, each TTI of the set of first duration TTIs is a symbol period. In some examples, a data symbol of the sequence contains the sidelink control message. The sequence of data and reference signal transmissions may, for instance, include two or more TTIs corresponding to data retransmissions. In some cases, the sidelink control message includes a resource block assignment, an MCS, a timing advance, a group destination identification (ID), a time resource allocation, or the like.

The control messaging module 605 may also receive a downlink control message including an indicator of a pattern, corresponding to a sequence of data and reference signal transmissions that use the first duration TTI. In some examples, the sequence is a set of first duration TTIs, where each TTI of the set of first duration TTIs includes either data or a reference signal. Each TTI of the set of first duration TTIs may be a symbol period, for instance. In some cases, a data symbol of the sequence includes the sidelink control message. The sequence of data and reference signal transmissions may contain two or more TTIs corresponding data retransmissions. In some cases, the sidelink control message includes a resource block assignment, an MCS, a timing advance, a group destination ID, a time resource allocation, and the like. The downlink control message may include some combination of a time resource allocation, DMRS cyclic shift information, a transmit power control parameter, a frequency hopping parameter, or a resource block allocation. In some examples, the time resource allocation includes the indication of the pattern for the sequence of data and reference signal transmissions. The sequence may include a set of first duration TTIs, where each TTI of the set of first duration TTIs, in turn, includes either data or a reference signal. In some examples, the downlink control message may be transmitted during the second duration TTI.

The pattern selection module 610 may identify the pattern based on the indicator as described with reference to FIGS. 2-4. Identifying the pattern may include selecting the pattern from a predetermined set of patterns based on the indicator. The pattern selection module 610 may also identify the pattern based on the indicator. The transmission decoding module 615 may decode the sequence of data and reference signal transmissions using the pattern as described with reference to FIGS. 2-4.

Figure 7:
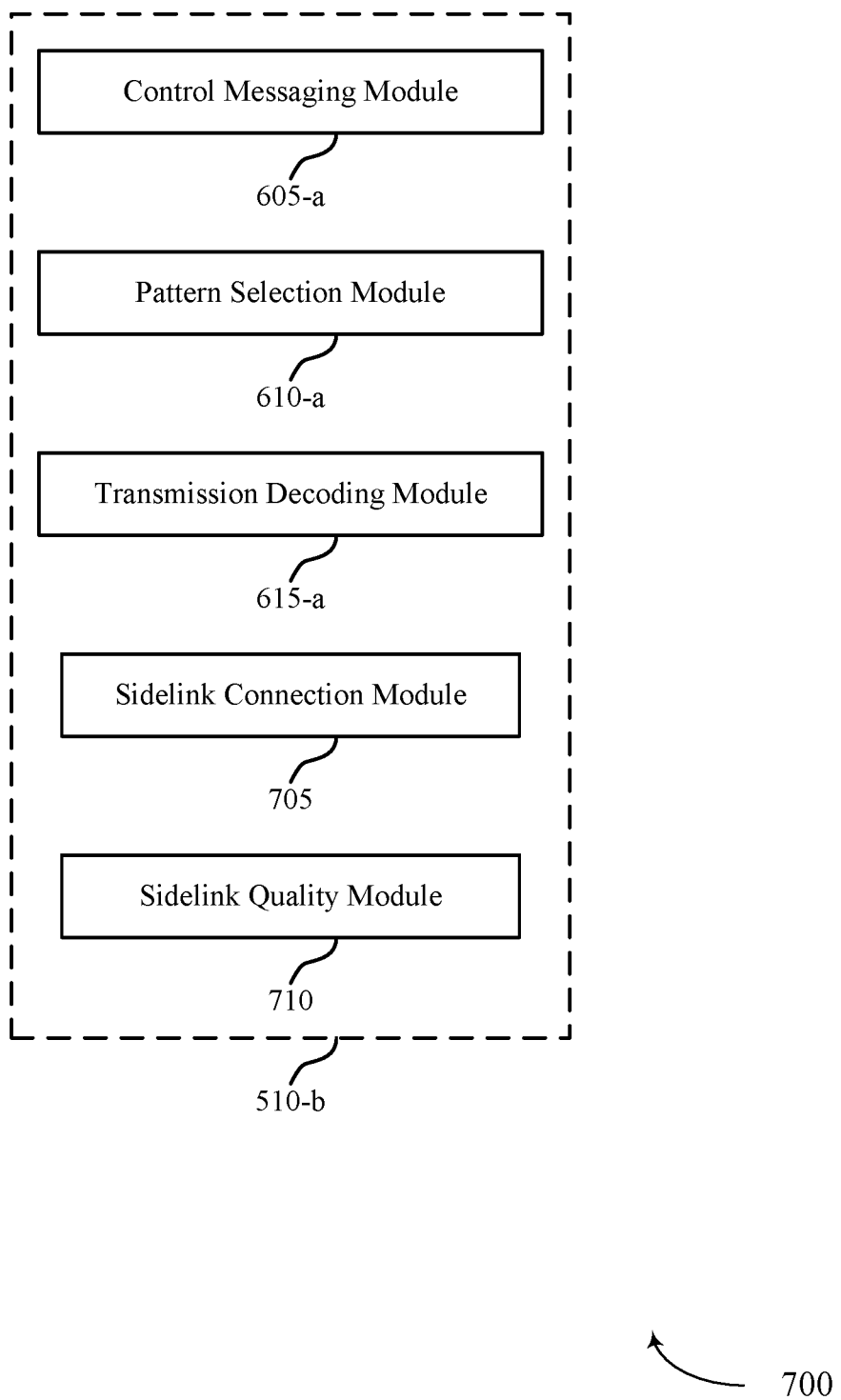

FIG. 7 shows a block diagram 700 of a low latency/D2D module 510-*b* which may be a component of a wireless device 500 or a wireless device 600 that supports low latency communication in accordance with various aspects of the present disclosure. The low latency/D2D module 510-*b* may be an example of aspects of a low latency/D2D module 510 described with reference to FIGS. 5-6. The low latency/D2D module 510-*b* may include a control messaging module 605-*a*, a pattern selection module 610-*a*, and a transmission decoding module 615-*a*. Each of these modules may perform the functions described with reference to FIG. 6. The low latency/D2D module 510-*b* may also include a sidelink connection module 705, and a sidelink quality module 710.

The sidelink connection module 705 may receive a synchronization or discovery signal during the second duration TTI, and the sidelink control message may be received during the first duration TTI as described with reference to FIGS. 2-4. The sidelink connection module 705 may also establish a sidelink connection with a mobile device based at least in part on the synchronization or discovery signal; the sidelink control message may be received from the mobile device. The sidelink connection module 705 may, in some examples, transmit a synchronization or discovery signal during the second duration TTI; the sidelink control message may be transmitted during the first duration TTI, for instance. The sidelink connection module 705 may also establish a sidelink connection with a mobile device based on the synchronization or discovery signal, where the sidelink control message may be transmitted to the mobile device. The sidelink connection module 705 may also transmit to a base station signaling indicative of a desired mobile device for a sidelink connection. In some cases, the sidelink connection module 705 receives a confirmation message for the sidelink connection from the base station in response to the signaling. In some examples, the confirmation message may be based on the desired mobile device having a link quality above a threshold (e.g., a minimum RSSI). In some examples, the confirmation message includes an estimated signal strength associated with the desired mobile device. The sidelink connection module 705 may also determine— for example, based on signaling from a base station—that a sidelink between the first mobile device and second mobile device satisfies a criterion for communication using the first duration TTI, where the sidelink initiation signal is transmitted based on the determination that the sidelink satisfies the criterion.

The sidelink quality module 710 may receive from a base station a request for a quality report (e.g., a sidelink quality report) as described with reference to FIGS. 2-4. The sidelink quality module 710 may also transmit the quality report to the base station in response to the request. The sidelink quality module 710 may also receive an indication from the base station to operate using the first duration TTI, where the indication is responsive to the quality report. The sidelink quality module 710 may also receive the quality report from the second mobile device in response to the request.

Figure 8:
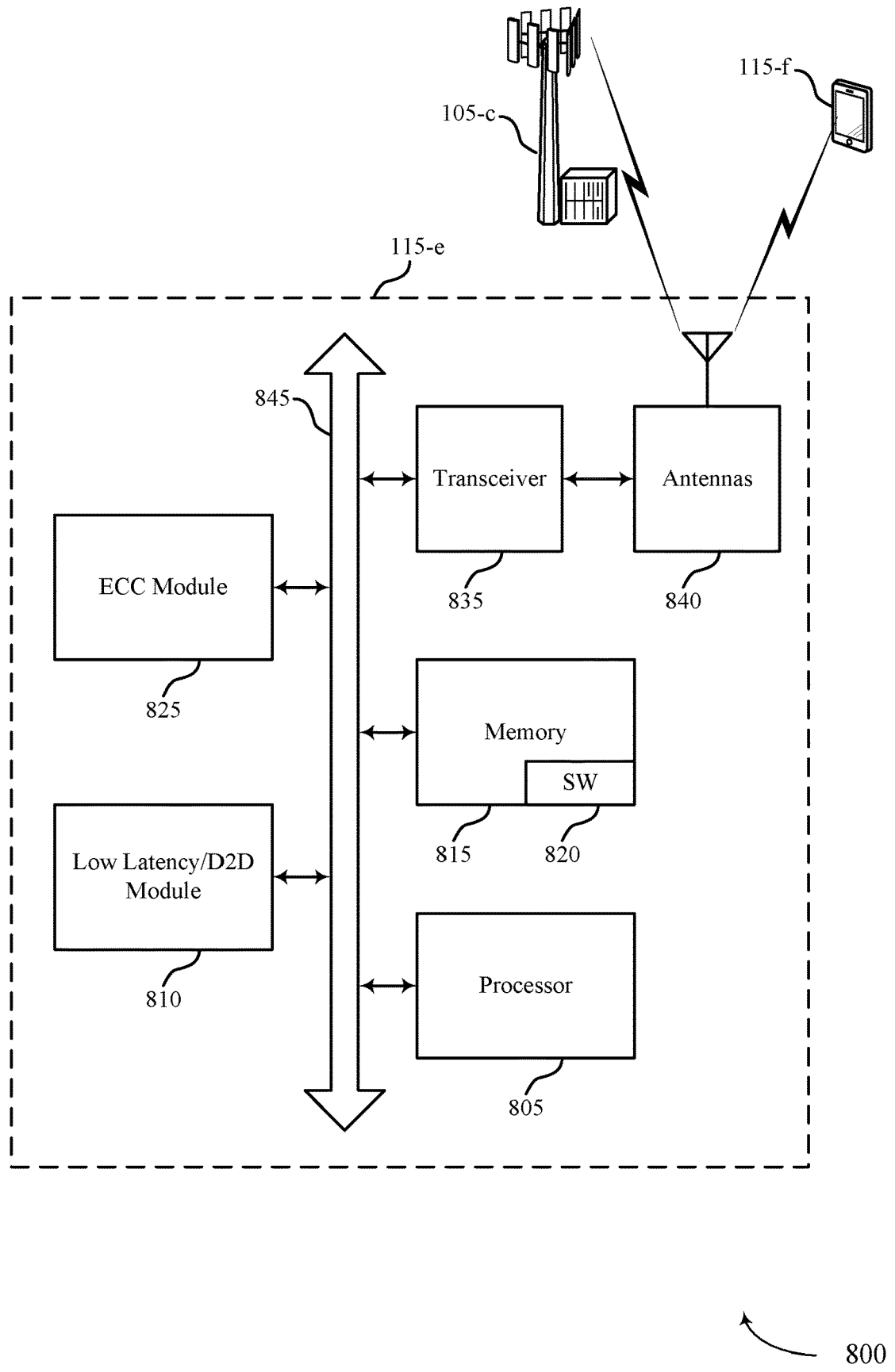
FIG. 8 illustrates a block diagram of a system, including a user equipment (UE), that supports low latency communication in accordance with various aspects of the present disclosure.

FIG. 8 shows a diagram of a system 800, including a UE, that supports low latency communication in accordance with various aspects of the present disclosure. System 800 may include UE 115-*e*, which may be an example of a wireless device 500, a wireless device 600, or a UE 115 described with reference to FIGS. 1, 2 and 5-7. UE 115-*e* may include a low latency/D2D module 810, which may be an example of a low latency/D2D module 510 described with reference to FIGS. 5-7. UE 115-*e* may also include an ECC module 825, which may enable communications using ECCs as described with reference to FIG. 1. UE 115-*e* may also include components for bi-directional voice and data communications including components for transmitting communications and components for receiving communications. For example, UE 115-*e* may communicate bi-directionally with UE 115-*f* or base station 105-*c*.

UE 115-*e* may also include a processor 805, and memory 815 (including software (SW) 820), a transceiver 835, and one or more antenna(s) 840, each of which may communicate, directly or indirectly, with one another (e.g., via buses 845). The transceiver 835 may communicate bi-directionally, with the antenna(s) 840 or wired or wireless links, with one or more networks, as described above. For example, the transceiver 835 may communicate bi-directionally with a base station 105 or another UE 115; transceiver 835, in combination with the low latency/D2D module 810, which may include the various submodules described with reference to FIGS. 5-7, may perform the various low latency D2D functions described herein. The transceiver 835 may include a modem to modulate the packets and provide the modulated packets to the antenna(s) 840 for transmission, and to demodulate packets received from the antenna(s) 840. While UE 115-*e* may include a single antenna 840, UE 115-*e* may also have multiple antennas 840 capable of concurrently transmitting or receiving multiple wireless transmissions.

The memory 815 may include random access memory (RAM) and read only memory (ROM). The memory 815 may store computer-readable, computer-executable software/firmware code 820 including instructions that, when executed, cause the processor 805 to perform various functions described herein (e.g., low latency D2D communication, etc.). Alternatively, the software/firmware code 820 may not be directly executable by the processor 805 but cause a computer (e.g., when compiled and executed) to perform functions described herein. The processor 805 may include an intelligent hardware device, (e.g., a central processing unit (CPU), a microcontroller, an application specific integrated circuit (ASIC), etc.)

Figure 9:
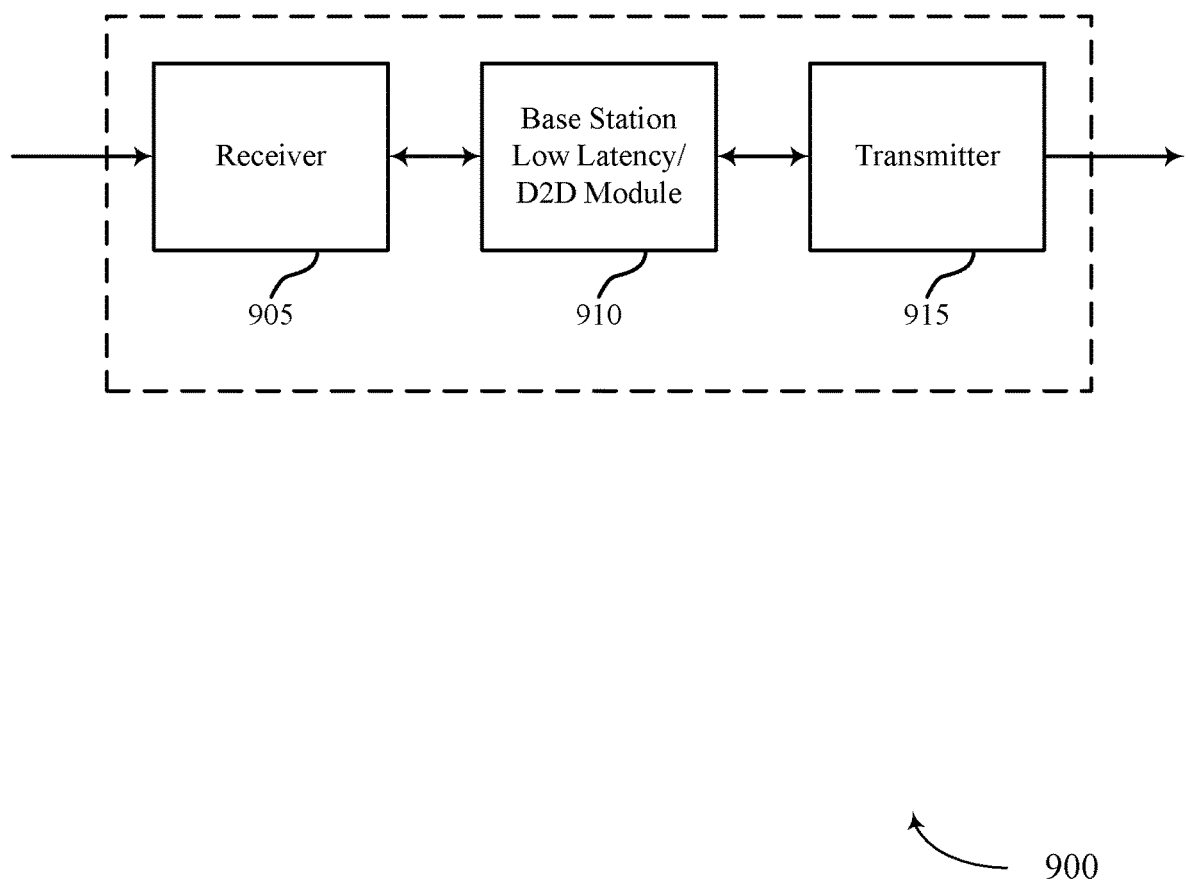
FIGS. 9-11 show block diagrams of a wireless device or devices that support low latency communication in accordance with various aspects of the present disclosure.

FIG. 9 shows a block diagram of a wireless device 900 that supports low latency communication in accordance with various aspects of the present disclosure. Wireless device 900 may be an example of aspects of a base station 105 described with reference to FIGS. 1-8. Wireless device 900 may include a receiver 905, a base station low latency/D2D module 910, or a transmitter 915. Wireless device 900 may also include a processor. Each of these components may be in communication with one another. Wireless device 900 may operate in a system that supports a first duration TTI and a second, longer duration TTI.

The receiver 905 may receive information such as packets, user data, or control information associated with various information channels (e.g., control channels, data channels, and information related to low latency and/or device-to-device communication, etc.). Information may be passed on to the base station low latency/D2D module 910, and to other components of wireless device 900.

The base station low latency/D2D module 910 may transmit a sidelink initiation signal to a first mobile device and to a second mobile device, determine a pattern corresponding to a sequence of data and reference signal transmissions from the first mobile device to the second mobile device, where the sequence of data and reference signal transmissions using the first duration TTI, and transmit a downlink control message to the first mobile device; the downlink control message may include an indicator of the pattern.

The transmitter 915 may transmit signals received from other components of wireless device 900. In some examples, the transmitter 915 may be collocated with the receiver 905 in a transceiver. The transmitter 915 may include a single antenna, or it may include a plurality of antennas.

Figure 10:
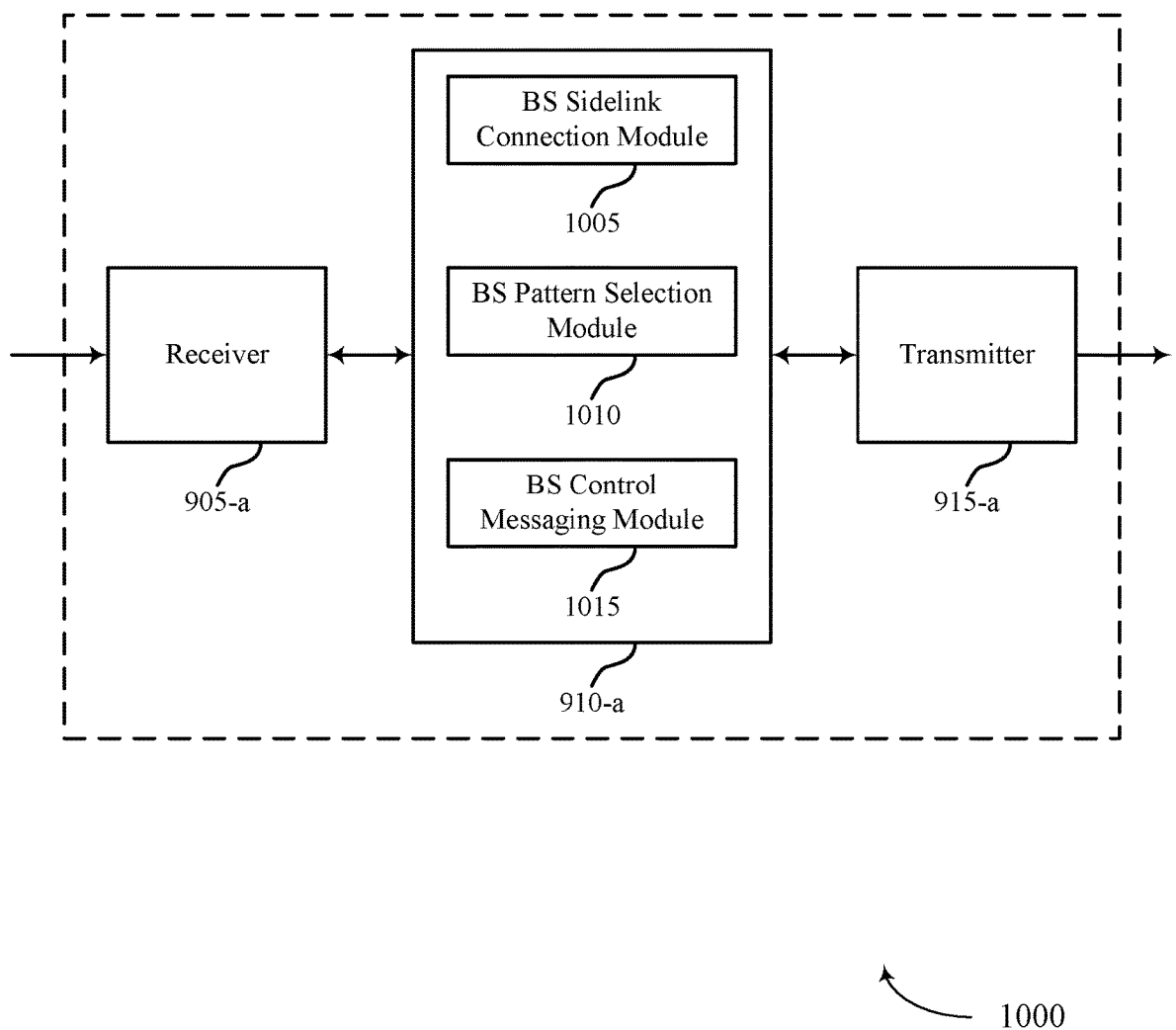

FIG. 10 shows a block diagram of a wireless device 1000 that supports low latency communication in accordance with various aspects of the present disclosure. Wireless device 1000 may be an example of aspects of a wireless device 900 or a base station 105 described with reference to FIGS. 1-9. Wireless device 1000 may include a receiver 905-a, a base station low latency/D2D module 910-a, or a transmitter 915-a. Wireless device 1000 may also include a processor. Each of these components may be in communication with one another. Wireless device 1000 may operate in a system that supports a first duration TTI and a second, longer duration TTI. The base station low latency/D2D module 910-a may also include a BS sidelink connection module 1005, a BS pattern selection module 1010, and a BS control messaging module 1015.

The receiver 905-a may receive information which may be passed on to base station low latency/D2D module 910-a, and to other components of wireless device 1000. The base station low latency/D2D module 910-a may perform the operations described with reference to FIG. 9. The transmitter 915-a may transmit signals received from other components of wireless device 1000.

The BS sidelink connection module 1005 may transmit a sidelink initiation signal to a first mobile device and to a second mobile device as described with reference to FIGS. 2-4.

The BS pattern selection module 1010 may determine a pattern corresponding to a sequence of data and reference signal transmissions from the first mobile device to the second mobile device, the sequence of data and reference signal transmissions using the first duration TTI as described with reference to FIGS. 2-4.

The BS control messaging module 1015 may transmit a downlink control message to the first mobile device, the downlink control message may include an indicator of the pattern as described with reference to FIGS. 2-4.

Figure 11:
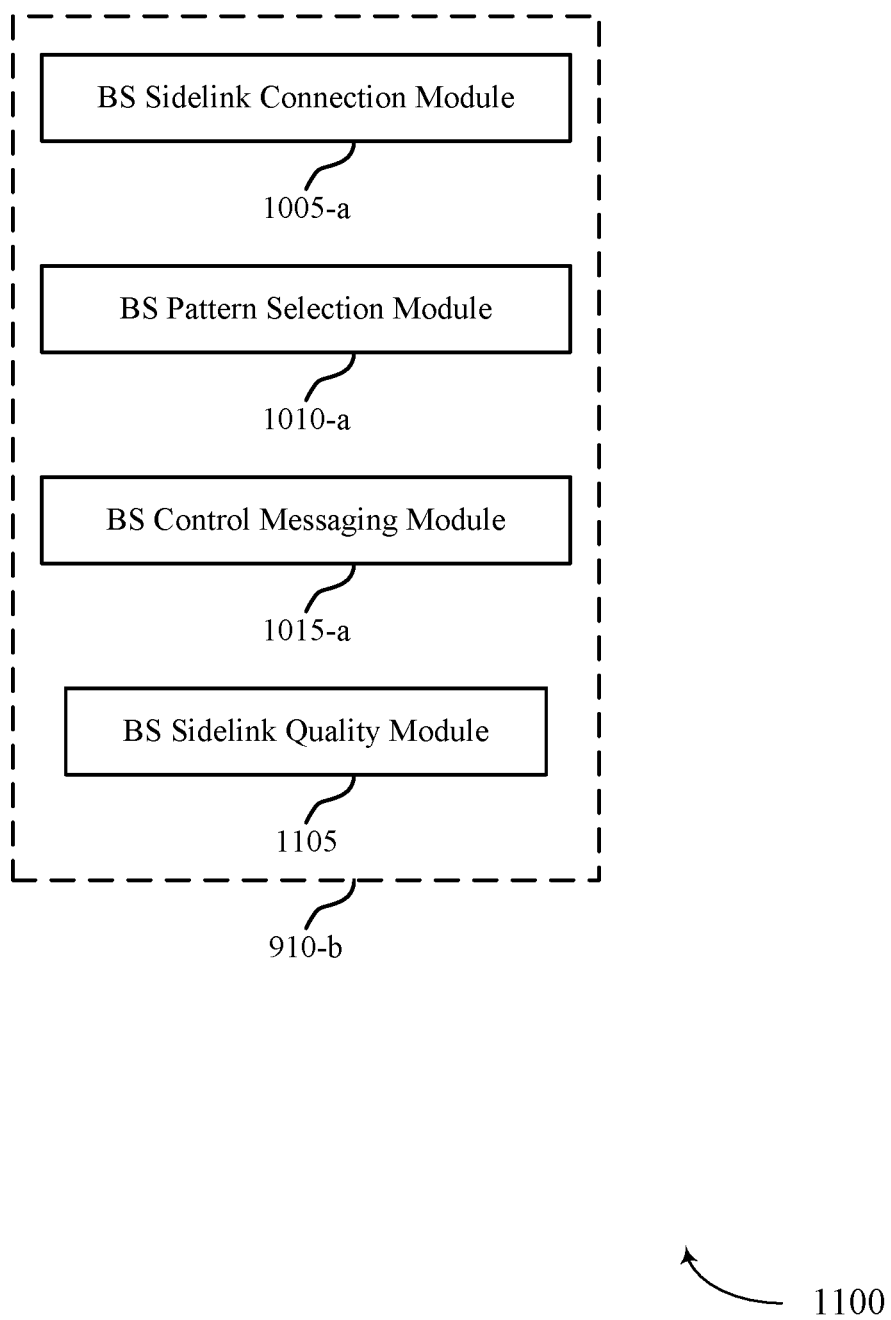

FIG. 11 shows a block diagram 1100 of a base station low latency/D2D module 910-b which may be a component of a wireless device 900 or a wireless device 1000 for low latency communication in accordance with various aspects of the present disclosure. The base station low latency/D2D module 910-b may be an example of aspects of a base station low latency/D2D module 910 described with reference to FIGS. 9-10. The base station low latency/D2D module 910-b may include a BS sidelink connection module 1005-a, a BS pattern selection module 1010-a, and a BS control messaging module 1015-a. Each of these modules may perform the functions described with reference to FIG. 10. The base station low latency/D2D module 910-b may also include and a BS sidelink quality module 1105.

The BS sidelink quality module 1105 may transmit a request for a quality report to the second mobile device as described with reference to FIGS. 2-4.

Figure 12:
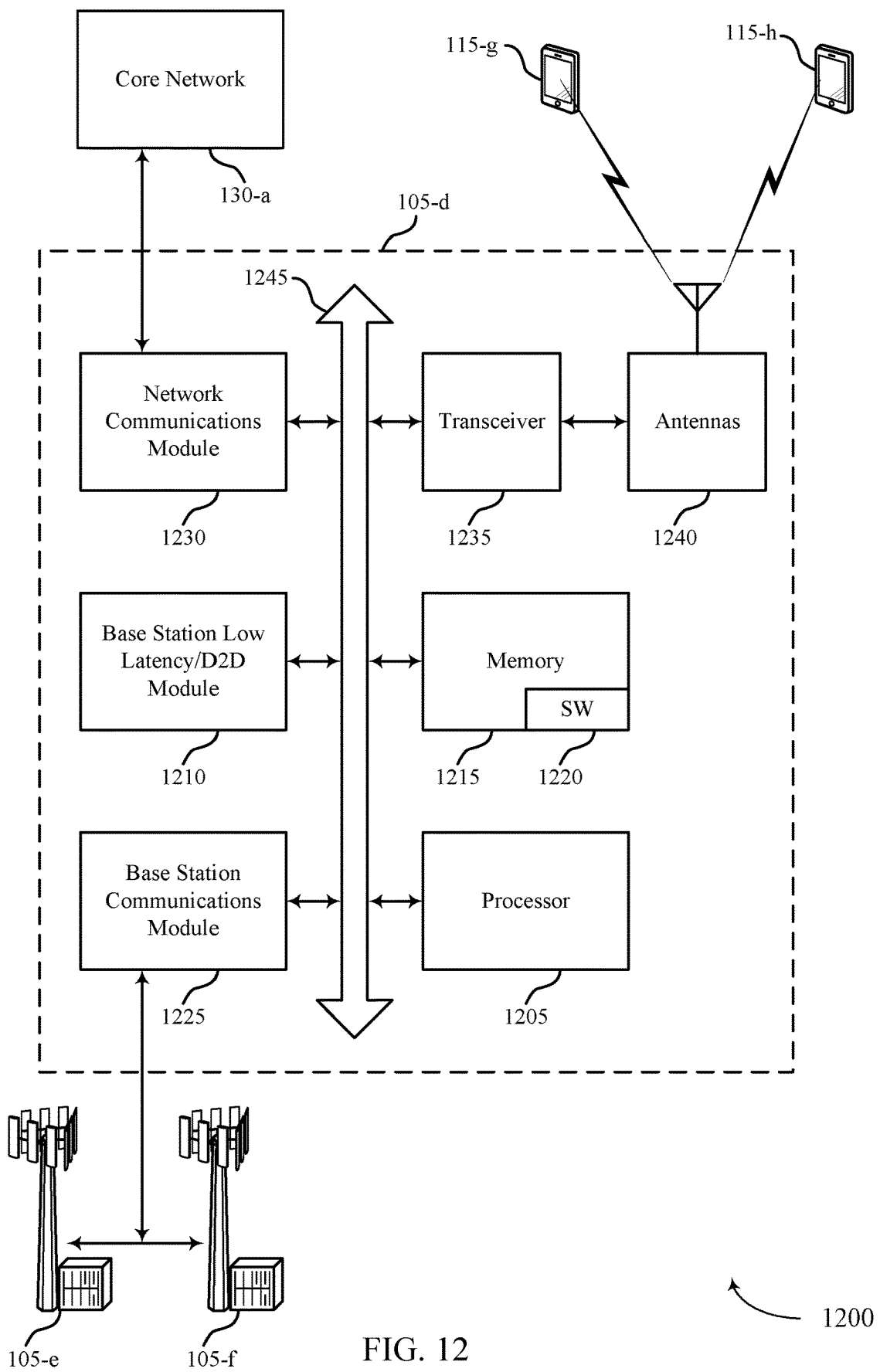
FIG. 12 illustrates a block diagram of a system, including a base station, that supports low latency communication in accordance with various aspects of the present disclosure.

FIG. 12 shows a diagram of a system 1200, including a base station that supports low latency communication in accordance with various aspects of the present disclosure. System 1200 may include base station 105-d, which may be an example of a wireless device 900, a wireless device 1000, or a base station 105 described with reference to FIGS. 1, 2 and 9-11. Base Station 105-d may include a base station low latency/D2D module 1210, which may be an example of a base station low latency/D2D module 910 described with reference to FIGS. 9-11. Base Station 105-d may also include components for bi-directional voice and data communications including components for transmitting communications and components for receiving communications. For example, base station 105-d may communicate bi-directionally with UE 115-g or UE 115-h.

In some cases, base station 105-d may have one or more wired backhaul links. Base station 105-d may have a wired backhaul link (e.g., S1 interface, etc.) to the core network 130. Base station 105-d may also communicate with other base stations 105, such as base station 105-e and base station 105-f via inter-base station backhaul links (e.g., an X2 interface). Each of the base stations 105 may communicate with UEs 115 using the same or different wireless communications technologies. In some cases, base station 105-d may communicate with other base stations such as 105-e or 105-f utilizing base station communications module 1225. In some examples, base station communications module 1225 may provide an X2 interface within an LTE/LTE-A wireless communication network technology to provide communication between some of the base stations 105. In some examples, base station 105-d may communicate with other base stations through core network 130. In some cases, base station 105-d may communicate with the core network 130 through network communications module 1230.

The base station 105-d may include a processor 1205, memory 1215 (including software (SW) 1220), transceiver 1235, and antenna(s) 1240, which each may be in communication, directly or indirectly, with one another (e.g., over bus system 1245). The transceivers 1235 may be configured to communicate bi-directionally, with antenna(s) 1240, with the UEs 115, which may be multi-mode devices. The transceiver 1235 (or other components of the base station 105-d) may also be configured to communicate bi-directionally, with antennas 1240, with one or more other base stations (not shown). The transceiver 1235 may include a modem configured to modulate the packets and provide the modulated packets to the antennas 1240 for transmission, and to demodulate packets received from the antennas 1240. The base station 105-d may include multiple transceivers 1235, each with one or more associated antennas 1240. The transceiver 1235 may be an example of a combined receiver 905 and transmitter 915 of FIG. 9. The transceiver 1235, in combination with the base station low latency/D2D module 1210, which may include the various submodules described with reference to FIGS. 9-10, may perform the various low latency D2D functions described herein.

The memory 1215 may include RAM and ROM. The memory 1215 may also store computer-readable, computer-executable software code 1220 containing instructions that are configured to, when executed, cause the processor 1205 to perform various functions described herein (e.g., low latency communication, selecting coverage enhancement techniques, call processing, database management, message routing, etc.). Alternatively, the software code 1220 may not be directly executable by the processor 1205 but be configured to cause the computer, e.g., when compiled and executed, to perform functions described herein. The processor 1205 may include an intelligent hardware device, e.g., a CPU, a microcontroller, an ASIC, etc. The processor 1205 may include various special purpose processors such as encoders, queue processing modules, base band processors, radio head controllers, digital signal processor (DSPs), and the like.

The base station communications module 1225 may manage communications with other base stations 105. In some cases, a communications management module may include a controller or scheduler for controlling communications with UEs 115 in cooperation with other base stations 105. For example, the base station communications module 1225 may coordinate scheduling for transmissions to UEs 115 for various interference mitigation techniques such as beamforming or joint transmission.

The components of wireless device 500, wireless device 600, low latency/D2D module 510, system 800, wireless device 900, wireless device 1000, UE 115-e and base station 105-d may, individually or collectively, be implemented with at least one ASIC adapted to perform some or all of the applicable functions in hardware. Alternatively, the functions may be performed by one or more other processing units (or cores), on at least one IC. In other examples, other types of integrated circuits may be used (e.g., Structured/Platform ASICs, a field programmable gate array (FPGA), or another semi-custom IC), which may be programmed in any manner known in the art. The functions of each unit may also be implemented, in whole or in part, with instructions embodied in a memory, formatted to be executed by one or more general or application-specific processors.

Figure 13:
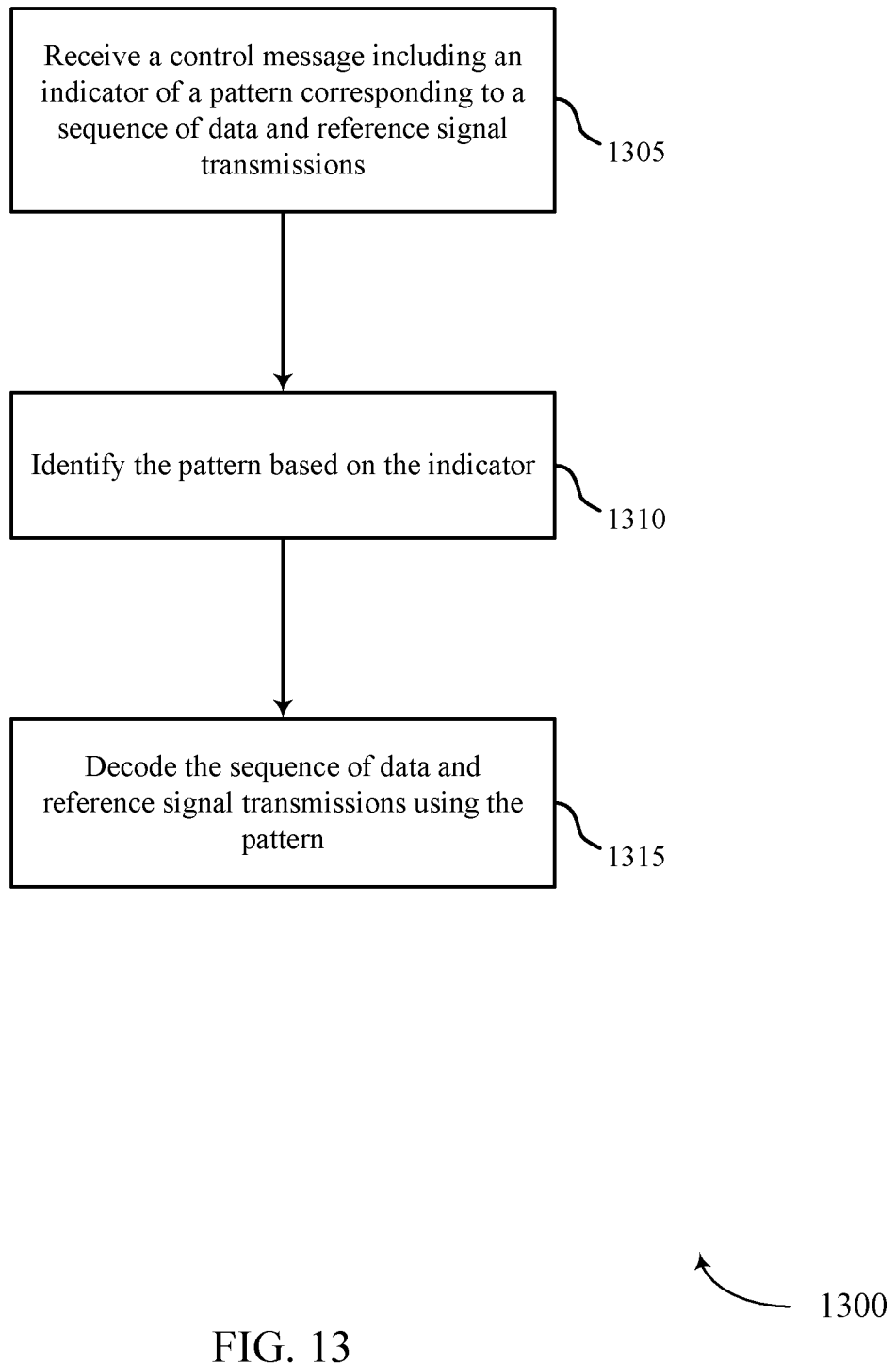
FIGS. 13-17 illustrate methods for low latency communication in accordance with various aspects of the present disclosure.

FIG. 13 shows a flowchart illustrating a method 1300 for low latency communication in accordance with various aspects of the present disclosure. The operations of method 1300 may be implemented by a UE 115 or its components as described with reference to FIGS. 1-12. For example, the operations of method 1300 may be performed by the low latency/D2D module 510 as described with reference to FIGS. 5-8. In some examples, a UE 115 may execute a set of codes to control the functional elements of the UE 115 to perform the functions described below. Additionally or alternatively, the UE 115 may perform aspects the functions described below using special-purpose hardware.

At block 1305, the UE 115 may operate in a system that supports a first duration TTI and a second, longer duration TTI and may receive a control message that includes an indicator of a pattern corresponding to a sequence of data and reference signal transmissions that use the first duration TTI as described with reference to FIGS. 2-4. The sequence of data and reference signal transmissions may be or include a set of first duration TTIs, and wherein each TTI of the set of first duration TTIs comprises a symbol period. A data symbol of the sequence of data and reference signal transmissions may include the control message. In some examples, the control message is a sidelink control message. Additionally or alternatively, the control message may include a resource block assignment, a modulation and coding scheme (MCS), a timing advance, a group destination identification (ID), or a time resource allocation, or any combination thereof. In certain examples, the operations of block 1305 may be performed by the control messaging module 605 as described with reference to FIG. 6 or the low latency/D2D module 810 in combination with the transceiver 835 of FIG. 8.

At block 1310, the UE 115 may identify the pattern based at least in part on the indicator as described with reference to FIGS. 2-4. Identifying the pattern may include selecting the pattern from a predetermined set of patterns based at least in part on the indicator. In certain examples, the operations of block 1310 may be performed by the pattern selection module 610 as described with reference to FIG. 6.

At block 1315, the UE 115 may decode the sequence of data and reference signal transmissions using the pattern as described with reference to FIGS. 2-4. In certain examples, the operations of block 1315 may be performed by the transmission decoding module 615 as described with reference to FIG. 6.

In some examples, method 1300 may include receiving a synchronization or discovery signal during the second duration TTI, wherein the control message is received during the first duration TTI. Some examples may also include establishing a connection with a mobile device based at least in part on the synchronization or discovery signal. In certain examples, such operations may be performed by the transceiver 835 of FIG. 8.

In some examples, method 1300 may include receiving from a base station a request for a quality report, and it may include transmitting the quality report to the base station in response to the request. The quality report may be a sidelink quality report. An indication may be to operate using the first duration TTI may be received from the base station, and the indication may be responsive to the quality report. In certain examples, such operations may be performed by the transceiver 835 of FIG. 8.

Figure 14:
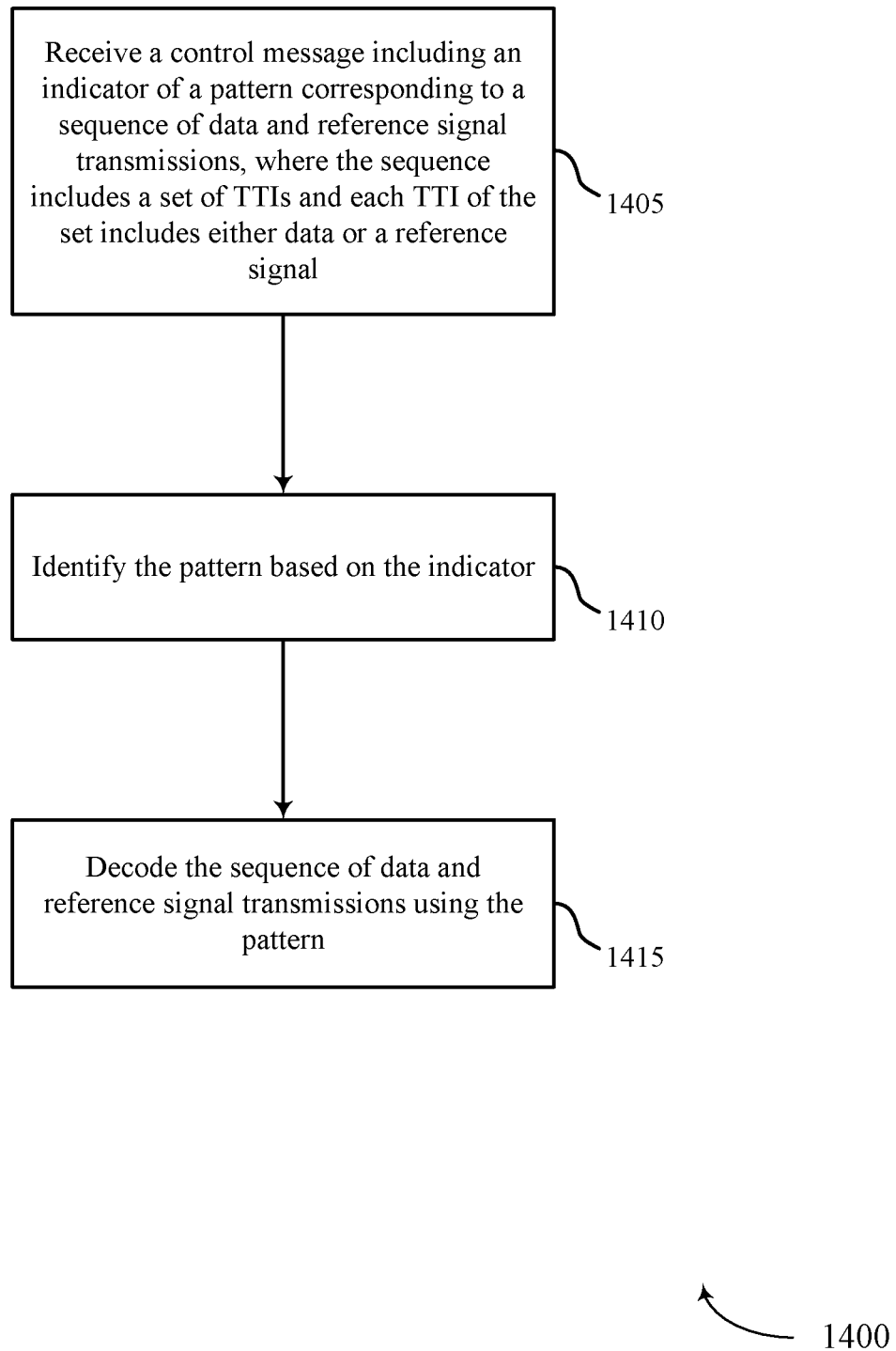

FIG. 14 shows a flowchart illustrating a method 1400 for low latency communication in accordance with various aspects of the present disclosure. The operations of method 1400 may be implemented by a UE 115 or its components as described with reference to FIGS. 1-12. For example, the operations of method 1400 may be performed by the low latency/D2D module 510 as described with reference to FIGS. 5-8. In some examples, a UE 115 may execute a set of codes to control the functional elements of the UE 115 to perform the functions described below. Additionally or alternatively, the UE 115 may perform aspects the functions described below using special-purpose hardware. The method 1400 may also incorporate aspects of method 1300 of FIG. 13.

At block 1405, the UE 115 may operate in a system that supports a first duration TTI and a second, longer duration TTI and may receive a sidelink control message that includes an indicator of a pattern corresponding to a sequence of data and reference signal transmissions that use the first duration TTI as described with reference to FIGS. 2-4. In some cases, the sequence is a set of first duration TTIs, and each TTI of the set of first duration TTIs may include either data or a reference signal. In certain examples, the operations of block 1405 may be performed by the control messaging module 605 as described with reference to FIG. 6 or the low latency/D2D module 810 in combination with the transceiver 835 of FIG. 8.

At block 1410, the UE 115 may identify the pattern based at least in part on the indicator as described with reference to FIGS. 2-4. In certain examples, the operations of block 1410 may be performed by the pattern selection module 610 as described with reference to FIG. 6.

At block 1415, the UE 115 may decode the sequence of data and reference signal transmissions using the pattern as described with reference to FIGS. 2-4. In certain examples, the operations of block 1415 may be performed by the transmission decoding module 615 as described with reference to FIG. 6.

Figure 15:
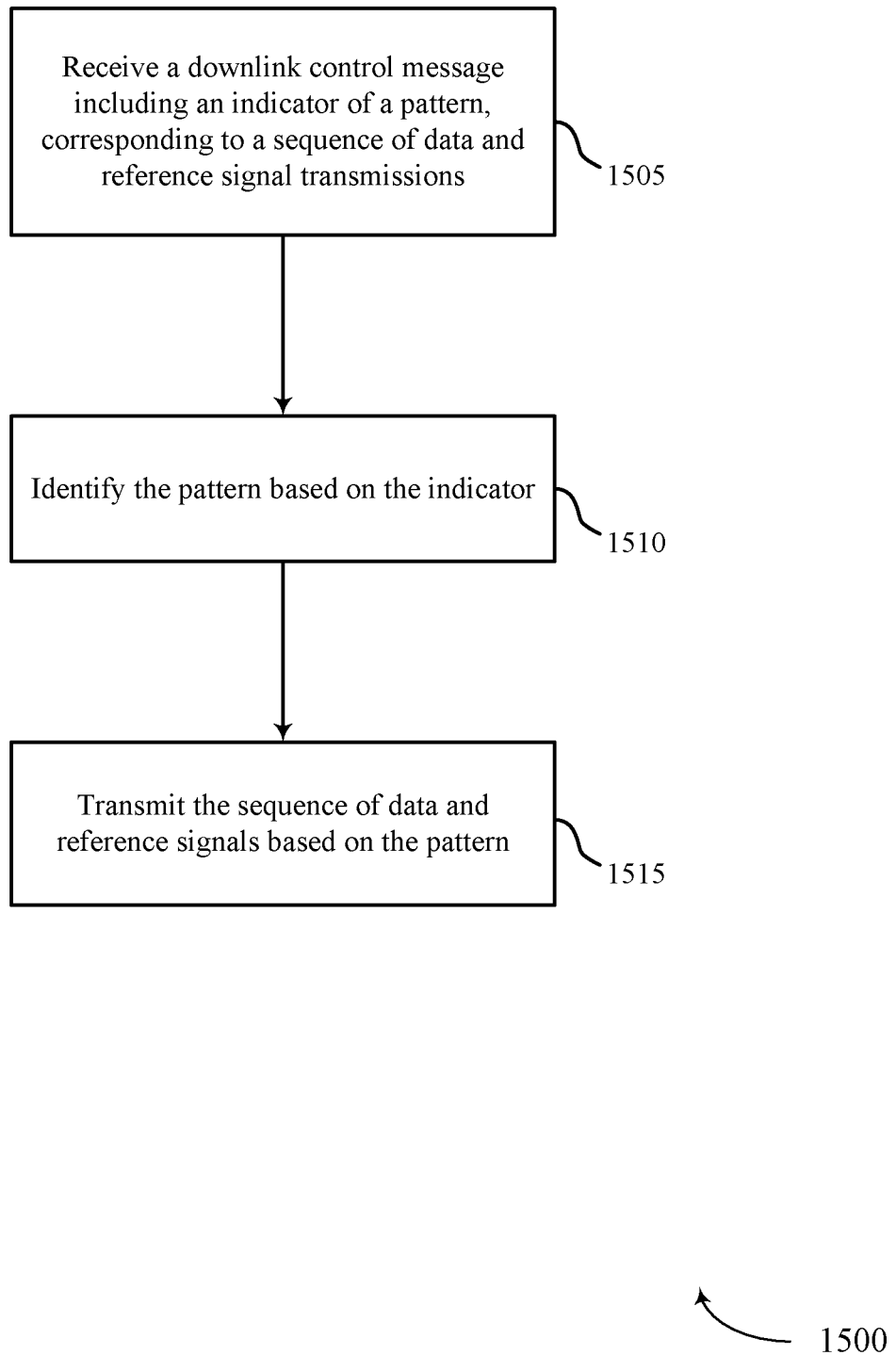

FIG. 15 shows a flowchart illustrating a method 1500 for low latency communication in accordance with various aspects of the present disclosure. The operations of method 1500 may be implemented by a UE 115 or its components as described with reference to FIGS. 1-12. For example, the operations of method 1500 may be performed by the low latency/D2D module 510 as described with reference to FIGS. 5-8. In some examples, a UE 115 may execute a set of codes to control the functional elements of the UE 115 to perform the functions described below. Additionally or alternatively, the UE 115 may perform aspects the functions described below using special-purpose hardware. The method 1500 may also incorporate aspects of methods 1300, and 1400 of FIGS. 13-14.

At block 1505, the UE 115 may operate in a system that supports a first duration TTI and a second longer duration TTI, and may receive a downlink control message with an indicator of a pattern, corresponding to a sequence of data and reference signal transmissions that use the first duration TTI as described with reference to FIGS. 2-4. The sequence of data and reference signal transmissions may be or include a set of first duration TTIs, and wherein each TTI of the set of first duration TTIs comprises a symbol period. The sequence of data and reference signal transmissions may include two or more TTIs corresponding to data retransmissions. A data symbol of the sequence of data and reference signal transmissions may include the control message. The downlink control message may include a resource block assignment, a modulation and coding scheme (MCS), a timing advance, a group destination identification (ID), or a time resource allocation, or any combination thereof. In certain examples, the operations of block 1505 may be performed by the control messaging module 605 as described with reference to FIG. 6 or the low latency/D2D module 810 in combination with the transceiver 835 of FIG. 8.

At block 1510, the UE 115 may identify the pattern based at least in part on the indicator as described with reference to FIGS. 2-4. Identifying the pattern may include selecting the pattern from a predetermined set of patterns based at least in part on the indicator. In certain examples, the operations of block 1510 may be performed by the pattern selection module 610 as described with reference to FIG. 6.

At block 1515, the UE 115 may transmit the sequence of data and reference signals based at least in part on the pattern as described with reference to FIGS. 2-4. In certain examples, the operations of block 1520 may be performed by the transmitter 515 as described with reference to FIG. 5 or the low latency/D2D module 810 in combination with the transceiver 835 of FIG. 8. In some examples, UE 115 may also transmit a sidelink control message with the indicator as described with reference to FIGS. 2-4. Additionally or alternatively, UE 115 may transmit a synchronization or discovery signal during the second duration TTI, and the control message may be transmitted during the first duration TTI. In some examples, UE 115 may establish a connection with a mobile device based at least in part on the synchronization or discovery signal. Such operations may be performed by the transmitter 515 as described with reference to FIG. 5 or the low latency/D2D module 810 in combination with the transceiver 835 of FIG. 8.

In some examples, method 1500 includes transmitting to a base station signaling indicative of a desired mobile device for a connection and receiving a confirmation message for the connection from the base station in response to the signaling. The confirmation message may be based at least in part on the desired mobile device having a link quality above a threshold. The confirmation message may include an estimated signal strength associated with the desired mobile device. Such operations may be performed by the transceiver 835 of FIG. 8.

Figure 16:
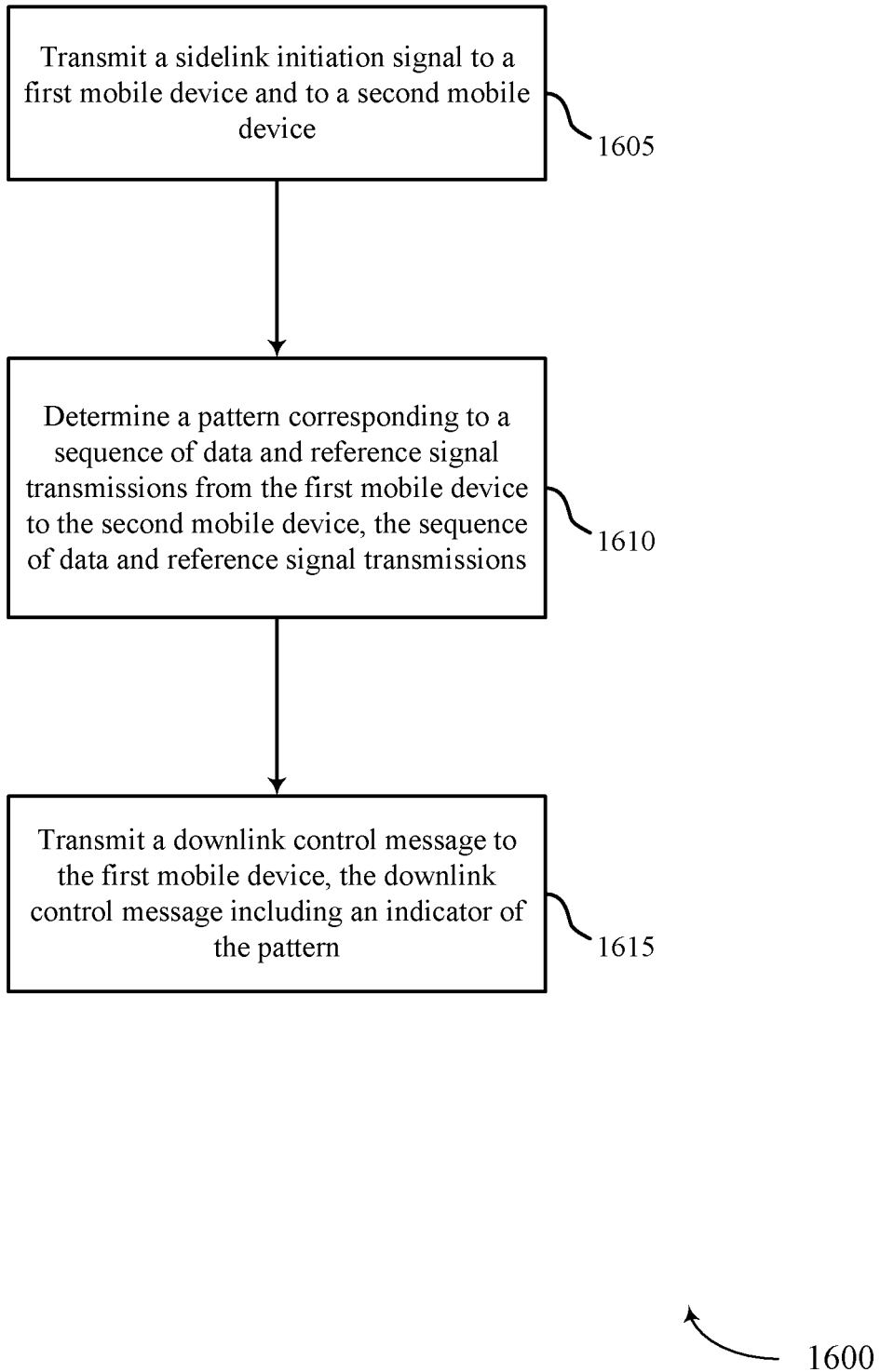

FIG. 16 shows a flowchart illustrating a method 1600 for low latency communication in accordance with various aspects of the present disclosure. The operations of method 1600 may be implemented by a base station 105 or its components as described with reference to FIGS. 1-12. For example, the operations of method 1600 may be performed by the base station low latency/D2D module 910 as described with reference to FIGS. 9-12. In some examples, a base station 105 may execute a set of codes to control the functional elements of the base station 105 to perform the functions described below. Additionally or alternatively, the base station 105 may perform aspects the functions described below using special-purpose hardware.

At block 1605, the base station 105 may operate in a system that supports a first duration TTI and a second, longer duration TTI and may transmit a sidelink initiation signal to a first mobile device and to a second mobile device as described with reference to FIGS. 2-4. In certain examples, the operations of block 1605 may be performed by the BS sidelink connection module 1005 as described with reference to FIG. 10 or the base station low latency/D2D module 1210 in combination with the transceiver 1235 of FIG. 12.

At block 1610, the base station 105 may determine a pattern corresponding to a sequence of data and reference signal transmissions from the first mobile device to the second mobile device, the sequence of data and reference signal transmissions using the first duration TTI as described with reference to FIGS. 2-4. In certain examples, the operations of block 1610 may be performed by the BS pattern selection module 1010 as described with reference to FIG. 10.

At block 1615, the base station 105 may transmit a downlink control message to the first mobile device, the downlink control message that includes an indicator of the pattern as described with reference to FIGS. 2-4. In certain examples, the operations of block 1615 may be performed by the BS control messaging module 1015 as described with reference to FIG. 10 or the base station low latency/D2D module 1210 in combination with the transceiver 1235 of FIG. 12.

Figure 17:
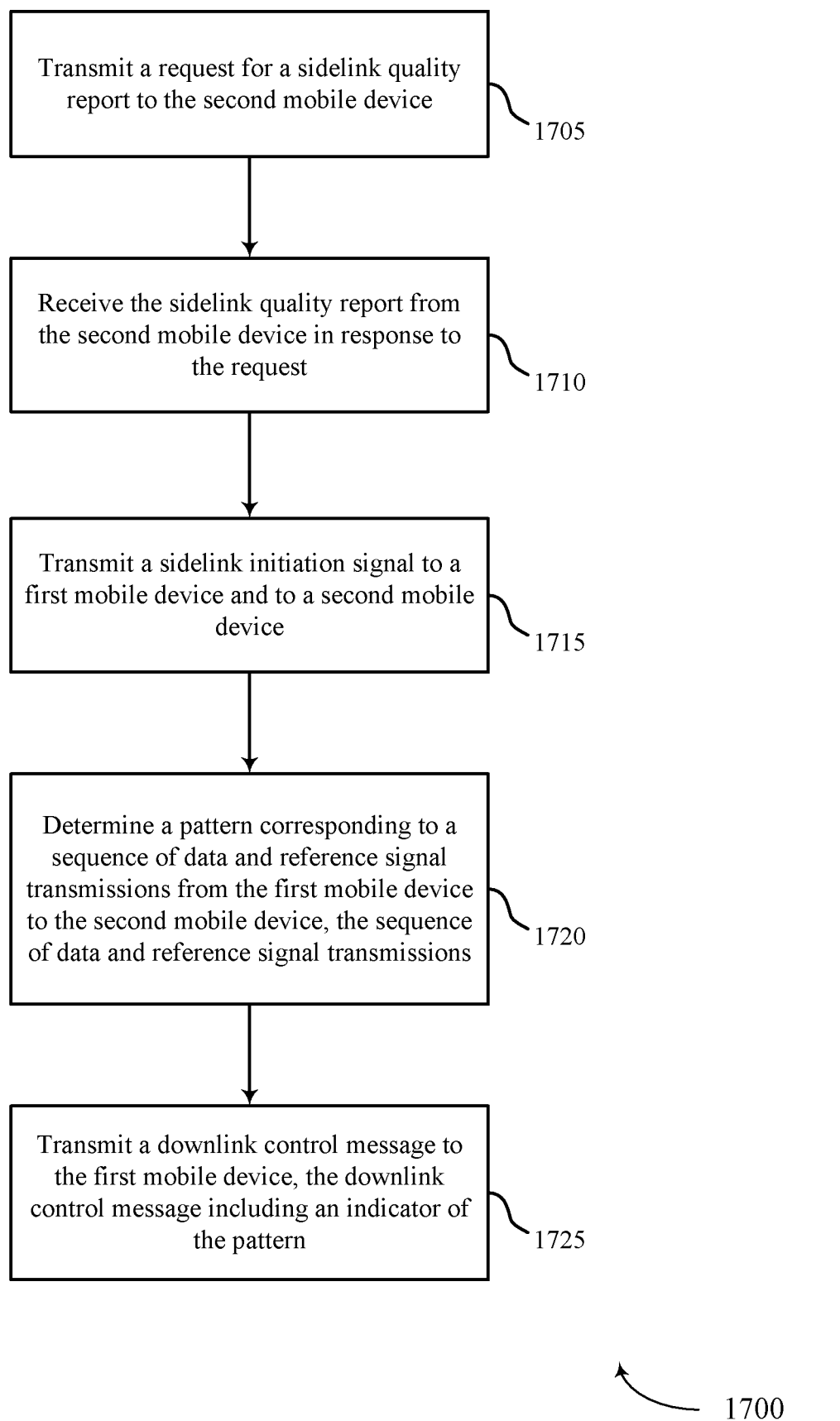

FIG. 17 shows a flowchart illustrating a method 1700 for low latency communication in accordance with various aspects of the present disclosure. The operations of method 1700 may be implemented by a base station 105 or its components as described with reference to FIGS. 1-12. For example, the operations of method 1700 may be performed by the base station low latency/D2D module 910 as described with reference to FIGS. 9-12. In some examples, a base station 105 may execute a set of codes to control the functional elements of the base station 105 to perform the functions described below. Additionally or alternatively, the base station 105 may perform aspects the functions described below using special-purpose hardware. The method 1700 may also incorporate aspects of method 1600 of FIG. 16.

At block 1705, the base station 105 may operate in a system that supports a first duration TTI and a second, longer duration TTI and may transmit a request for a quality report to the second mobile device as described with reference to FIGS. 2-4. In certain examples, the operations of block 1705 may be performed by the BS sidelink quality module 1105 as described with reference to FIG. 11 or the base station low latency/D2D module 1210 in combination with the transceiver 1235 of FIG. 12.

At block 1710, the base station 105 may receive the quality report from the second mobile device in response to the request as described with reference to FIGS. 2-4. In certain examples, the operations of block 1710 may be performed by the sidelink quality module 710 as described with reference to FIG. 7.

At block 1715, the base station 105 may transmit a sidelink initiation signal to a first mobile device and to a second mobile device as described with reference to FIGS. 2-4. In certain examples, the operations of block 1715 may be performed by the BS sidelink connection module 1005 as described with reference to FIG. 10 or the base station low latency/D2D module 1210 in combination with the transceiver 1235 of FIG. 12.

At block 1720, the base station 105 may determine a pattern corresponding to a sequence of data and reference signal transmissions from the first mobile device to the second mobile device, the sequence of data and reference signal transmissions using the first duration TTI as described with reference to FIGS. 2-4. In certain examples, the operations of block 1720 may be performed by the BS pattern selection module 1010 as described with reference to FIG. 10.

At block 1725, the base station 105 may transmit a downlink control message to the first mobile device, the downlink control message with an indicator of the pattern as described with reference to FIGS. 2-4. In certain examples, the operations of block 1725 may be performed by the BS control messaging module 1015 as described with reference to FIG. 10 or the base station low latency/D2D module 1210 in combination with the transceiver 1235 of FIG. 12.

Thus, methods 1300, 1400, 1500, 1600, and 1700 may provide for low latency and/or device-to-device communication. It should be noted that methods 1300, 1400, 1500, 1600, and 1700 describe possible implementation, and that the operations and the steps may be rearranged or otherwise modified such that other implementations are possible. In some examples, aspects from two or more of the methods 1300, 1400, 1500, 1600, and 1700 may be combined.

The description herein provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. Also, features described with respect to some examples may be combined in other examples.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. The terms "system" and "network" are often used interchangeably. A code division multiple access (CDMA) system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1X, 1X, etc. IS-856 (TIA-856) is commonly referred to as CDMA2000 1xEV-DO, High Rate Packet Data (HRPD), etc. UTRA includes Wideband CDMA (WCDMA) and other variants of CDMA. A time division multiple access (TDMA) system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM, etc. UTRA and E-UTRA are part of Universal Mobile Telecommunications system (UMTS). 3GPP Long Term Evolution (LTE) and LTE-Advanced (LTE-A) are new releases of Universal Mobile Telecommunications System (UMTS) that use E-UTRA. UTRA, E-UTRA, Universal Mobile Telecommunications System (UMTS), LTE, LTE-A, and Global System for Mobile communications (GSM) are described in documents from an organization named "Third Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. The description herein, however, describes an LTE system for purposes of example, and LTE terminology is used in much of the description above, although the techniques are applicable beyond LTE applications.

In LTE/LTE-A networks, including such networks described herein, the term evolved node B (eNB) may be generally used to describe the base stations. The wireless communications system or systems described herein may include a heterogeneous LTE/LTE-A network in which different types of evolved node B (eNBs) provide coverage for various geographical regions. For example, each eNB or base station may provide communication coverage for a macro cell, a small cell, or other types of cell. The term "cell" is a 3GPP term that can be used to describe a base station, a carrier or component carrier associated with a base station, or a coverage area (e.g., sector, etc.) of a carrier or base station, depending on context.

Base stations may include or may be referred to by those skilled in the art as a base transceiver station, a radio base station, an access point, a radio transceiver, a NodeB, eNodeB (eNB), Home NodeB, a Home eNodeB, or some other suitable terminology. The geographic coverage area for a base station may be divided into sectors making up only a portion of the coverage area. The wireless communications system or systems described herein may include base stations of different types (e.g., macro or small cell base stations). The UEs described herein may be able to communicate with various types of base stations and network equipment including macro eNBs, small cell eNBs, relay base stations, and the like. There may be overlapping geographic coverage areas for different technologies.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers). A UE may be able to communicate with various types of base stations and network equipment including macro eNBs, small cell eNBs, relay base stations, and the like.

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The downlink transmissions described herein may also be called forward link transmissions while the uplink transmissions may also be called reverse link transmissions. Each communication link described herein—including, for example, wireless communications system 100 and 200 of FIGS. 1 and 2—may include one or more carriers, where each carrier may be a signal made up of multiple sub-carriers (e.g., waveform signals of different frequencies). Each modulated signal may be sent on a different sub-carrier and may carry control information (e.g., reference signals, control channels, etc.), overhead information, user data, etc. The communication links described herein (e.g., communication links 125 or 126 of FIG. 1) may transmit bidirectional communications using frequency division duplex (FDD) (e.g., using paired spectrum resources) or TDD operation (e.g., using unpaired spectrum resources). Frame structures may be defined for frequency division duplex (FDD) (e.g., frame structure type 1) and TDD (e.g., frame structure type 2).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a digital signal processor (DSP) and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C).

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," "component," and the like may not be a substitute for the word "means." As such, no claim element is to be construed as a means plus function unless the element is expressly recited using the phrase "means for."

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

What is claimed is:

1. A method of wireless communication in a system, comprising:
   receiving, at a user equipment (UE) in the system that supports a first duration transmission time interval (TTI) that is less than or equal to one slot, and a second duration TTI with two slots, wherein the second duration TTI includes the first duration TTI, a synchronization or discovery signal during the second duration TTI;
   receiving, during the first duration TTI and based at least in part on the synchronization or discovery signal received during the second duration TTI, a control message comprising an indicator of a pattern corresponding to a sequence of transmissions comprising data transmissions and reference signal transmissions, wherein the sequence of transmissions is transmitted during the first duration TTI;
   identifying, based at least in part on the indicator of the pattern, the pattern of data transmissions and reference signal transmissions, wherein the reference signals identified by the pattern are used by the UE to decode the data transmissions; and
   decoding, by the UE, the data transmissions using the reference signals identified by the pattern.

2. The method of claim 1, wherein identifying the pattern comprises:
   selecting the pattern from a predetermined set of patterns based at least in part on the indicator.

3. The method of claim 1, further comprising:
   establishing a connection with a mobile device based at least in part on the synchronization or discovery signal, wherein the control message is received from the mobile device using the established connection.

4. The method of claim 1, wherein the sequence of transmissions comprises a set of first duration TTIs, and wherein each TTI of the set of first duration TTIs comprises a symbol period.

5. The method of claim 1, wherein a data symbol of the sequence of transmissions comprises the control message.

6. The method of claim 1, wherein the control message comprises a sidelink control message.

7. The method of claim 1, wherein the control message comprises a resource block assignment, a modulation and coding scheme (MCS), a timing advance, a group destination identification (ID), or a time resource allocation, or any combination thereof.

8. The method of claim 1, further comprising:
   receiving from a base station a request for a quality report; and
   transmitting the quality report to the base station in response to the request.

9. The method of claim 8, further comprising:
   receiving an indication from the base station to operate using the first duration TTI, wherein the indication is responsive to the quality report.

10. A method of wireless communication, comprising:
    receiving, at a user equipment (UE) in a system that supports a first duration transmission time interval (TTI) that is less than or equal to one slot, and a second duration TTI with two slots, wherein the second duration TTI includes the first duration TTI, a downlink control message comprising an indicator of a pattern corresponding to a sequence of transmissions comprising data transmissions and reference signal transmissions, wherein the sequence of transmissions is transmitted during the first duration TTI;
    identifying, by the UE, the pattern of data transmissions and reference signal transmissions based at least in part on the indicator of the pattern;
    transmitting a synchronization or discovery signal during the second duration TTI;
    transmitting, based at least in part on the synchronization or discovery signal transmitted during the second duration TTI, a control message comprising the indicator during the first duration TTI; and
    transmitting the sequence of transmissions based at least in part on the pattern.

11. The method of claim 10, wherein identifying the pattern comprises:
    selecting the pattern from a predetermined set of patterns based at least in part on the indicator.

12. The method of claim 10, wherein the sequence of transmissions comprises a set of first duration TTIs, and wherein each TTI of the set of first duration TTIs comprises a symbol period.

13. The method of claim 10, wherein the sequence of transmissions comprises two or more TTIs corresponding to data retransmissions.

14. The method of claim 10, wherein the control message comprises a sidelink control message.

15. The method of claim 10, further comprising:
    establishing a connection with a mobile device based at least in part on the synchronization or discovery signal, wherein the control message is transmitted to the mobile device using the established connection.

16. The method of claim 10, wherein a data symbol of the sequence transmissions comprises the control message.

17. The method of claim 10, wherein the downlink control message comprises a resource block assignment, a modulation and coding scheme (MCS), a timing advance, a group destination identification (ID), or a time resource allocation, or any combination thereof.

18. The method of claim 10, further comprising:
    transmitting to a base station signaling indicative of a desired mobile device for a connection; and
    receiving a confirmation message for the connection from the base station in response to the signaling, wherein the control message is transmitted using the connection with the desired mobile device.

19. The method of claim 18, wherein the confirmation message is based at least in part on the desired mobile device having a link quality above a threshold.

20. The method of claim 19, wherein the confirmation message comprises an estimated signal strength associated with the desired mobile device.

21. An apparatus for wireless communication, comprising:
- a processor;
- memory in electronic communication with the processor; and
- instructions stored in the memory and operable, when executed by the processor, to cause the apparatus to:
    - receive, at the apparatus in a system that supports a first duration transmission time interval (TTI) that is less than or equal to one slot, and a second duration TTI with two slots, wherein the second duration TTI includes the first duration TTI, a synchronization or discovery signal during the second duration TTI;
    - receive, during the first duration TTI and based at least in part on the synchronization signal or discovery signal received during the second duration TTI, a control message comprising an indicator of a pattern corresponding to a sequence of transmissions comprising data transmissions and reference signal transmissions, wherein the sequence of transmissions is transmitted during the first duration TTI;
    - identify, based at least in part on the indicator of the pattern, the pattern of data transmissions and reference signal transmissions, wherein the reference signals identified by the pattern are used by the apparatus to decode the data transmissions; and
    - decode, by the apparatus, the data transmissions using the reference signals identified by the pattern.

22. The apparatus of claim 21, wherein the instructions are executable by the processor to cause the apparatus to:
- select the pattern from a predetermined set of patterns based at least in part on the indicator.

23. An apparatus for wireless communication, comprising:
- a processor;
- memory in electronic communication with the processor; and
- instructions stored in the memory and operable, when executed by the processor, to cause the apparatus to:
    - receive, at the apparatus in a system that supports a first duration transmission time interval (TTI) that is less than or equal to one slot, and a second duration TTI with two slots, wherein the second duration TTI includes the first duration TTI, a downlink control message comprising an indicator of a pattern, corresponding to a sequence of transmissions comprising data transmissions and reference signal transmissions, wherein the sequence of transmissions is transmitted during the first duration TTI;
    - identify, by the apparatus, the pattern of data transmissions and reference signal transmissions based at least in part on the indicator of the pattern;
    - transmit a synchronization or discovery signal during the second duration TTI;
    - transmit, based at least in part on the synchronization or discovery signal transmitted during the second duration TTI, a control message comprising the indicator during the first duration TTI; and
    - transmit the sequence of transmissions based at least in part on the pattern.

24. The apparatus of claim 23, wherein the instructions are executable by the processor to cause the apparatus to:
- select the pattern from a predetermined set of patterns based at least in part on the indicator.

* * * * *